(12) United States Patent
Doi et al.

(10) Patent No.: US 12,269,694 B2
(45) Date of Patent: Apr. 8, 2025

(54) CONTROLLER

(71) Applicant: OMRON Corporation, Kyoto (JP)

(72) Inventors: Sayaka Doi, Kyoto (JP); Hiroki Koga, Kyoto (JP); Shinji Kawakami, Kyoto (JP); Yukihisa Karako, Kyoto (JP)

(73) Assignee: OMRON Corporation, Kyoto (JP)

( * ) Notice: Subject to any disclaimer, the term of this patent is extended or adjusted under 35 U.S.C. 154(b) by 676 days.

(21) Appl. No.: 17/604,799

(22) PCT Filed: May 13, 2019

(86) PCT No.: PCT/JP2019/018993
§ 371 (c)(1),
(2) Date: Oct. 19, 2021

(87) PCT Pub. No.: WO2020/230250
PCT Pub. Date: Nov. 19, 2020

(65) Prior Publication Data
US 2022/0212884 A1  Jul. 7, 2022

(51) Int. Cl.
*B65G 47/91* (2006.01)
*B25J 15/06* (2006.01)

(52) U.S. Cl.
CPC ........ *B65G 47/917* (2013.01); *B25J 15/0616* (2013.01)

(58) Field of Classification Search
CPC .... B25J 15/0616; B25J 15/0004; B25J 13/08; B25J 13/081; B25J 13/084; B25J 13/085; B25J 13/088; B25J 13/089; B25J 9/1005; B25J 9/1612; B65G 47/917; B66C 1/0256; B66C 1/0262; G01B 21/32; G01B 11/16; G01B 11/165; G05B 2219/39529

USPC ......................................................... 294/183
See application file for complete search history.

(56) References Cited

U.S. PATENT DOCUMENTS

| 7,645,111 B2 | 1/2010 | Mori et al. |
| 7,971,916 B2 * | 7/2011 | Lin ..................... B25J 15/0616 |
| | | 269/27 |
| 8,070,203 B2 * | 12/2011 | Schaumberger ...... B66C 1/0243 |
| | | 294/186 |
| 10,023,400 B2 * | 7/2018 | Tanaka ................. B65G 47/917 |
| 2009/0206216 A1 | 8/2009 | Katsutani |

(Continued)

FOREIGN PATENT DOCUMENTS

| CN | 2603501 Y | 2/2004 |
| CN | 101237965 A | 8/2008 |

(Continued)

OTHER PUBLICATIONS

Extended European search report issued on Jun. 2, 2022 in a counterpart European patent application.

(Continued)

*Primary Examiner* — Paul T Chin
(74) *Attorney, Agent, or Firm* — METROLEX IP LAW GROUP, PLLC; Robert L. Scott, Esq.

(57) ABSTRACT

A controller includes: a deformation information obtaining unit configured to obtain information on deformation of a suction portion that suctions an object with negative pressure, and that is deformed by the negative pressure; and an operation control unit configured to control movement of the suction portion in accordance with deformation of the suction portion.

20 Claims, 18 Drawing Sheets

(56) References Cited

U.S. PATENT DOCUMENTS

| | | | |
|---|---|---|---|
| 2010/0109360 A1* | 5/2010 | Meisho | B25J 17/0208 901/32 |
| 2010/0194061 A1 | 8/2010 | Otaguro et al. | |
| 2017/0057091 A1 | 3/2017 | Wagner et al. | |
| 2017/0080571 A1 | 3/2017 | Wagner et al. | |
| 2019/0105782 A1 | 4/2019 | Wagner et al. | |
| 2019/0366551 A1 | 12/2019 | Wagner et al. | |
| 2020/0147801 A1 | 5/2020 | Wagner et al. | |
| 2020/0223072 A1 | 7/2020 | Wagner et al. | |
| 2021/0101285 A1 | 4/2021 | Wagner et al. | |

FOREIGN PATENT DOCUMENTS

| | | |
|---|---|---|
| CN | 101454126 A | 6/2009 |
| CN | 108058185 A | 5/2018 |
| CN | 108161645 A | 6/2018 |
| DE | 102015218195 A1 * | 3/2017 |
| JP | H6-72974 U | 10/1994 |
| JP | H6-335877 A | 12/1994 |
| JP | H11-333776 A | 12/1999 |
| JP | 2004-306169 A | 11/2004 |
| JP | 2005-262325 A | 9/2005 |
| JP | 2008149435 A * | 7/2008 |
| JP | 2018-89719 A | 6/2018 |
| JP | 2019-5866 A | 1/2019 |
| WO | 2016/142981 A1 | 9/2016 |

OTHER PUBLICATIONS

English translation of the International Search Report ("ISR") of PCT/JP2019/018993 mailed on Jul. 9, 2019.

Written Opinion("WO") of PCT/JP2019/018993 mailed on Jul. 9, 2019.

Office Action issued on Nov. 29, 2023, in a counterpart Chinese patent application.

\* cited by examiner

CONTROLLER

TECHNICAL FIELD

The disclosure relates to a controller for a conveyance robot arm or the like.

BACKGROUND ART

A conveyance robot including a suction pad at a distal end of its robot arm is known. In such a robot arm, negative pressure is generated in the suction pad, and a workpiece or the like, which is an object to be conveyed, is suctioned and picked up with the suction pad. When placing the object, generation of the negative pressure is stopped to release the suction. In such a type of robot arm, to pick up or place an object at an appropriate position and orientation, a sensor is installed near the suction portion of the robot arm, the position and orientation of the object before the suction pad comes into contact with the object are detected, and the movement of the suction portion is controlled based on the detection result.

RELATED ART DOCUMENT

Patent Document

Patent Document 1: JP 2018-089719A

SUMMARY

However, in the conveyance robot as described above, the sensor installed near the suction pad detects the orientation of the object before the suction portion comes into contact with the object. For this reason, the detection of the position and the orientation of the object is easily affected by environmental disturbances (light, vibrations, or electric noise), the material, color, and the like of the object due to the characteristics of the sensor, and it is difficult to control the orientation of the suction portion with high accuracy.

One or more embodiments may achieve a technique capable of controlling the movement of a suction pad as appropriate.

To solve the above issue, a controller according one or more embodiments may include: a deformation information obtaining unit configured to obtain information on deformation of a suction portion that suctions an object with negative pressure, and that is deformed by the negative pressure; and an operation control unit configured to control movement of the suction portion in accordance with deformation of the suction portion.

With the above configuration, it is possible to detect the orientation of the object by detecting the deformation of the suction portion after the suction portion has come into contact with the object. Accordingly, it is possible to achieve a controller capable of performing orientation correction with high accuracy without being affected by a disturbance environment.

In the controller according to one or more embodiments, the operation control unit may be configured to change an inclination of the suction portion in accordance with deformation of the suction portion.

With the above configuration, it is possible to detect the orientation of the workpiece after contact with the suction portion, based on the deformation of the suction portion. Accordingly, it is possible to achieve a controller capable of correcting the orientation of the workpiece with high accuracy without being affected by a disturbance environment.

In the controller according to one or more embodiments, the operation control unit may be configured to change an inclination of the suction portion to reduce an angle formed by a suction surface of the suction portion and a surface of the object to be suctioned.

With the above configuration, it is possible to detect the angle formed by the suction surface of the suction portion and the surface to be suctioned of the object, based on the deformation of the suction portion. Accordingly, it is possible to achieve a controller capable of correcting the orientation of the workpiece with high accuracy.

In the controller according to one or more embodiments, the operation control unit may include a contact point specifying unit configured to specify a contact point where the suction portion contacts the object based on deformation of the suction portion, and the operation control unit may be configured to change an inclination of the suction portion while maintaining contact between the suction portion and the object at the contact point.

With the above configuration, by changing the inclination of the suction portion while maintaining the contact between the suction portion and the object at the contact point, the suction portion and the object may be brought into intimate contact with each other. As a result, it may be possible to prevent an error of picking up the object by the suction portion.

In the controller according to one or more embodiments, the operation control unit may be configured to rotate the suction portion within a plane including a central axis of the suction surface of the suction portion and the contact point.

With the above configuration, by changing the inclination of the suction portion while maintaining the contact between the suction portion and the object at the contact point, the suction portion and the object may be brought into intimate contact with each other. As a result, it may be possible to prevent an error of picking up the object by the suction portion.

In the controller according to one or more embodiments, in a state where the suction portion is suctioning the object, the operation control unit may be configured to change the inclination of the suction portion to reduce an angle formed by a surface of the suctioned object, which is not the suctioned surface, and a surface on which the object is to be placed.

With the above configuration, when placing the object on the surface on which the object is to be placed, it is possible to detect the orientation of the suction portion after a part of the object has come into contact with the surface on which the object is to be placed. Accordingly, the object may be placed on the surface on which the object is to be placed with high accuracy.

In the controller according to one or more embodiments, the operation control unit may include a contact point specifying unit configured to specify a contact point where the object contacts the surface on which the object is to be placed, based on deformation of the suction portion, in a state where the suction portion is suctioning the object, and the operation control unit may be configured to change an inclination of the suction portion, while maintaining contact between the object and the surface on which the object is to be placed at the contact point.

With the above configuration, when placing the object on the surface on which the object is to be placed, it is possible to detect the orientation of the suction portion after a part of the object has come into contact with the surface on which the object is to be placed. Accordingly, the object [can] may be placed on the surface on which the object is to be placed with high accuracy.

In the controller according to one or more embodiments, the operation control unit may be configured to change the speed of the suction portion in accordance with deformation of the suction portion.

With the above configuration, it is possible to detect that the suction portion has come into contact with a part of the object based on the deformation of the suction portion. Accordingly, by changing the speed of the suction portion after the suction portion has come into contact with a part of the object, it is possible to perform correction with high accuracy, and prevent the risk of damaging the object.

In the controller according to one or more embodiments, if an amount of deformation of the suction portion exceeds a first threshold value, the operation control unit may be configured to reduce a speed at which the suction portion is brought closer to the object.

With the above configuration, it is possible to detect that the suction portion has come into contact with a part of the object based on the deformation of the suction portion. Accordingly, by reducing the speed of the suction portion after the suction portion has come into contact with a part of the object, it is possible to perform correction with high accuracy and prevent the risk of damaging the object.

In the controller according to one or more embodiments, if an amount of deformation of the suction portion exceeds a second threshold value, the operation control unit may be configured to stop an operation of bringing the suction portion closer to the object.

With the above configuration, it is possible to detect that the suction portion is in intimate contact with the object based on the amount of deformation of the suction portion. Accordingly, the operation of bringing the suction portion closer to the object may be stopped at an appropriate timing, and the object may be prevented from being damaged.

In the controller according to one or more embodiments, the deformation information obtaining unit may be configured to obtain an amount of deformation and/or a speed of deformation of the suction portion, and the operation control unit may be configured to control the movement of the suction portion in accordance with the amount of deformation and/or the speed of deformation of the suction portion.

With the above configuration, by controlling the movement of the suction portion based on the amount of deformation and/or the speed of deformation of the suction portion, the movement of the suction portion may be controlled with high accuracy.

In order to solve the above issue, a control method according to one or more embodiments may be a method of controlling a suction apparatus including a suction portion that suctions an object with negative pressure, and that is deformed by the negative pressure, the control method including: a deformation information obtainment step of obtaining information on deformation of the suction portion; and an operation control step of controlling movement of the suction portion in accordance with deformation of the suction portion.

With the above configuration, effects similar to those of the controller according to one or more embodiments may be obtained.

According to one or more embodiments, it may be possible to detect an amount of deformation of the suction portion after the suction portion has come into contact with an object, and correct the orientation of the suction portion based on the amount of deformation of the suction portion. Accordingly, it may be possible to provide a controller capable of controlling the movement of the suction portion with high accuracy without being affected by a disturbance environment.

DETAILED DESCRIPTION

Hereinafter, an embodiment according to one aspect of the present invention (hereinafter, also referred to as "present embodiment") will be described with reference to the drawings.

1. Application Example

Figure 1:
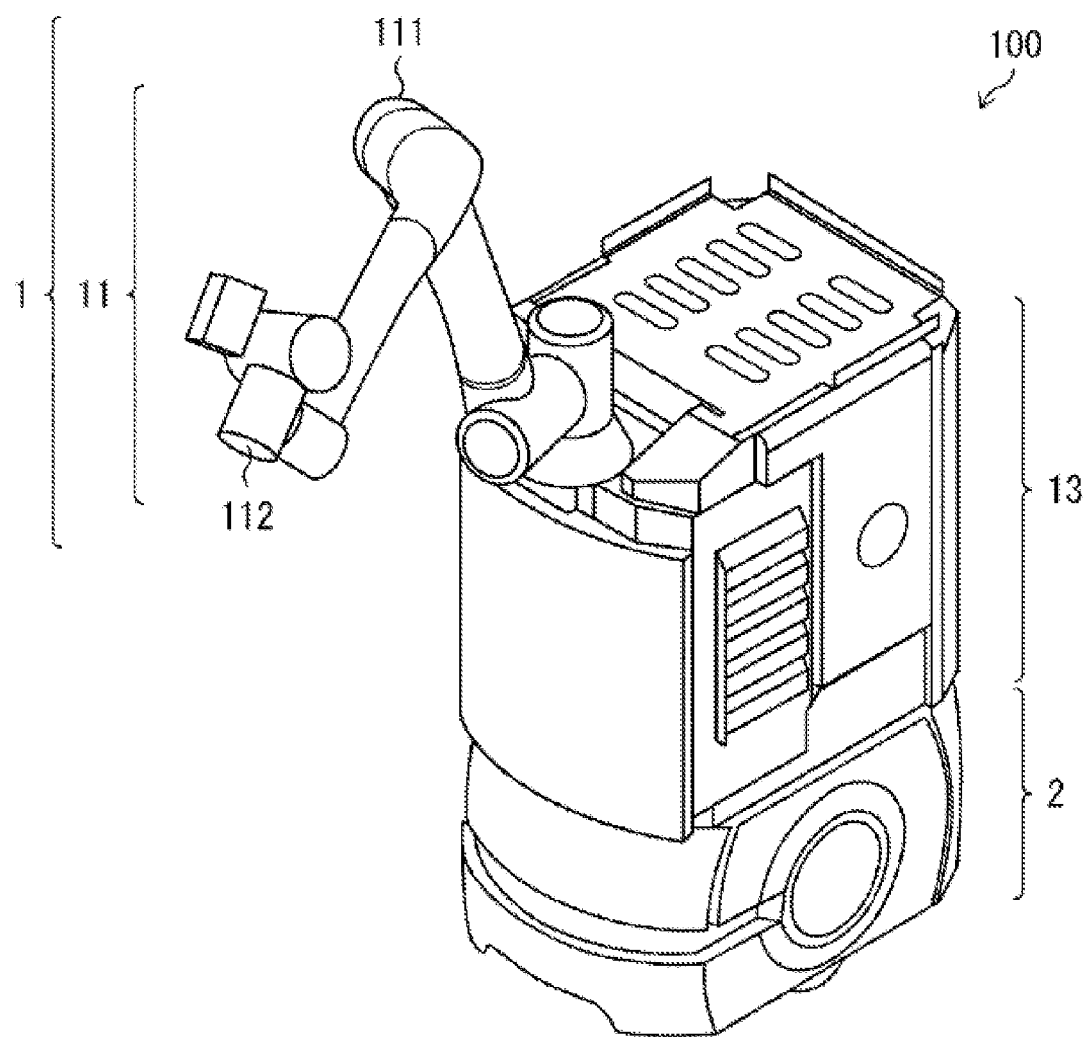
FIG. 1 is a schematic diagram illustrating an example of an application situation of a mobile suction apparatus according to one or more embodiments.
Figure 2:
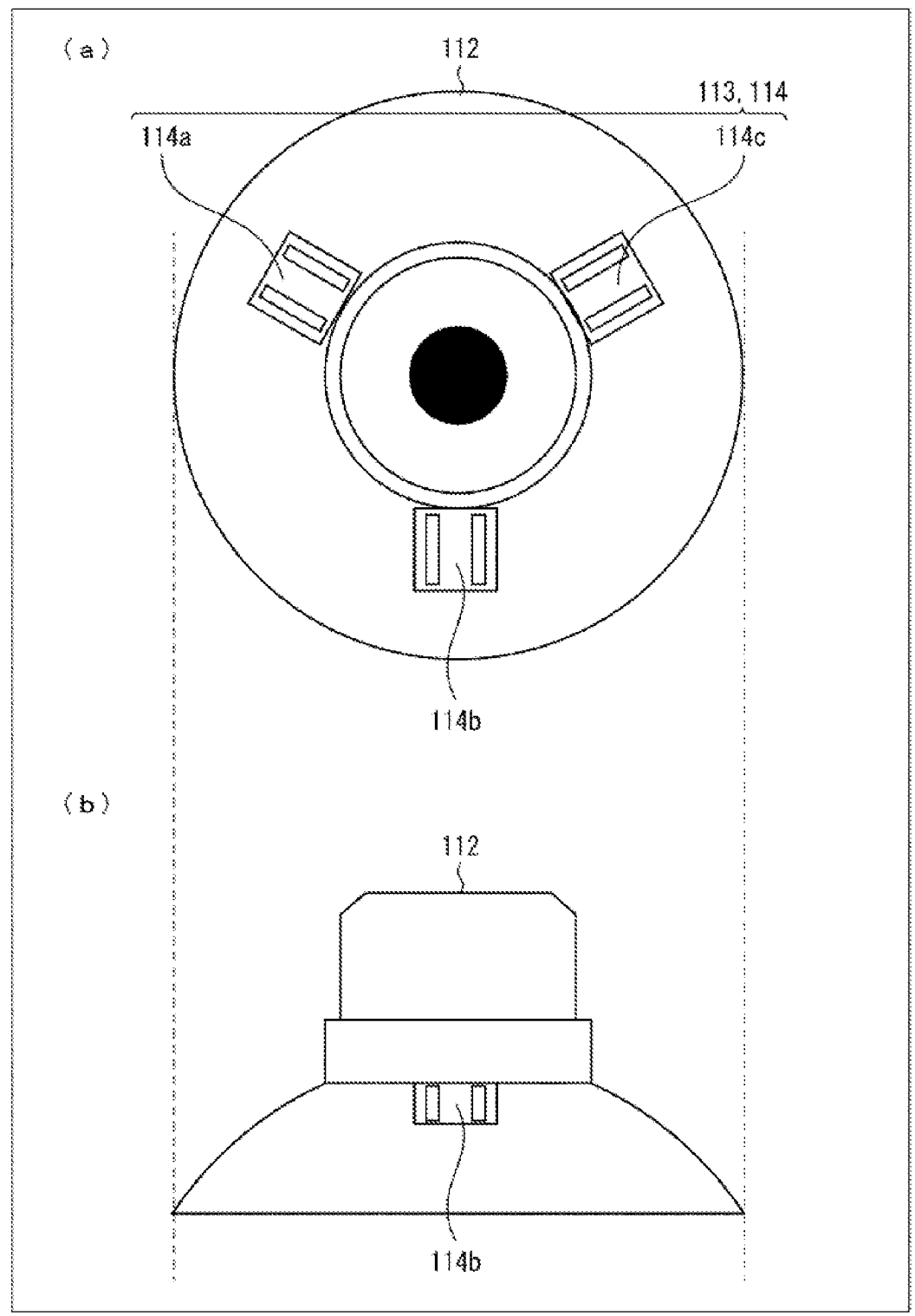
FIG. 2 is a schematic diagram illustrating an example of a suction pad (suction portion) and a deformation detection unit in a mobile suction apparatus according to one or more embodiments.

FIG. 1 schematically illustrates an example of an application situation of a controller 5 according to the present embodiment. FIG. 2 schematically illustrates an example of a suction pad (suction portion) 112 and a deformation information obtaining unit 113 in a mobile suction apparatus 100 in which the controller 5 according to the present embodiment is installed. Specifically, FIG. 2 (*a*) schematically illustrates an example of a top view of the suction pad 112 and the deformation information obtaining unit 113. Also, FIG. 2 (*b*) schematically illustrates an example of a side view of the suction pad 112 and the deformation information obtaining unit 113.

In the example of FIG. 1, the mobile suction apparatus 100 includes a suction apparatus 1 and a conveyance unit (automated guided vehicle) 2. The suction apparatus 1 includes a robot arm 11, a vacuum pump 12, and a manipulator control unit 13. The conveyance unit 2 moves (conveys) the mobile suction apparatus 100. The conveyance unit 2 includes a negative pressure control unit 21 that controls the vacuum pump that generates negative pressure (air pressure), and an automated guided vehicle 22. There is no limitation to the mobile suction apparatus 100 as long as the mobile suction apparatus 100 includes the suction apparatus 1 that includes the suction pad 112 that is deformed by negative pressure. An example of the mobile suction apparatus 100 is a vacuum suction system such as a mobile robot. In addition, the suction apparatus 1 can be applied not only to the mobile suction apparatus 100 such as a mobile robot, but also to a fixed suction apparatus.

The robot arm 11 performs a gripping operation by suctioning an object with negative pressure. The robot arm 11 includes the suction pad 112 and a manipulator unit 111 that performs a gripping operation of an object by causing the suction pad 112 to suction the object. An example of the suction pad 112 is a suction pad (vacuum pad) that is provided with a suction cup. The robot arm 11 including the manipulator unit 111 and the suction pad 112 can suitably suction and grip an object. The object may be any object that is gripped by being suctioned by the robot arm 11 with negative pressure, and an example of such an object is a workpiece.

As illustrated in the example of FIG. 2, the deformation information obtaining unit 113 that detects deformation of the suction pad 112 may also be disposed on (attached to) the suction pad 112. Also, as illustrated in the example of FIG. 2, the deformation information obtaining unit 113 may also include a strain sensor (strain gauge) 114 that is disposed on the suction pad 112. A strain measuring gauge terminal may also be included. The deformation information obtaining unit 113 may include one strain sensor 114, but may also include a plurality of (three, for example) strain sensors 114*a*, 114*b*, and 114*c* as illustrated in the example of FIG. 2. In this case, the deformation information obtaining unit 113 detects deformation (at least one of an amount of deformation and a speed of deformation (differential of the amount of deformation) of the suction pad 112, for example) at a plurality of locations in the suction pad 112. With this configuration, the deformation of the suction pad 112 can be detected better.

Hereinafter, with reference to FIGS. 2 to 4, an application situation of the mobile suction apparatus 1 that is provided with the above controller 5 will be described in detail.

(1) Picking Up an Object

Figure 4:
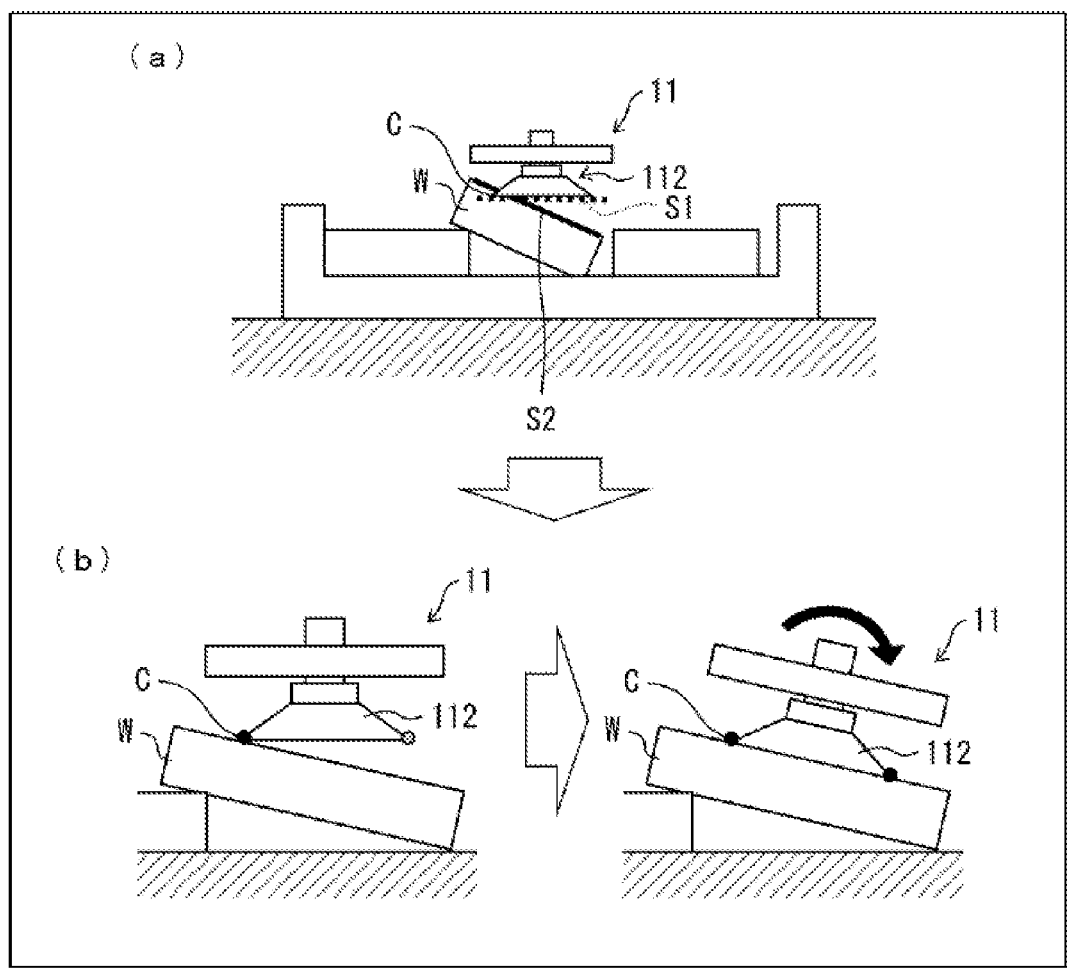
FIG. 4 is a diagram illustrating an example in which one or more embodiments is applied.

FIG. 4 is a schematic diagram illustrating a situation in which one workpiece W is picked up with the suction pad 112, from among a plurality of objects (workpieces) placed on a table. First, an example in which the present invention is applied to picking up an object will be described with reference to FIG. 4.

FIG. 4(*a*) shows a state of picking up an object in a conventional example, and FIG. 4(*b*) shows a state of picking up an object in an aspect of the present invention.

In FIG. 4(*a*), the controller of the conveyance robot lowers the robot arm including the suction pad 112 in the vertical direction to bring the suction pad 112 closer to a workpiece W placed on the table. Then, when the suction surface (suction plane) of the suction pad 112 and the surface to be suctioned of the workpiece W have come into contact with each other over the entire surface, the surface to be suctioned of the workpiece W is suctioned with negative pressure of the suction pad 112, and the suction surface of the suction pad 112 and the surface to be suctioned of the workpiece W are brought into intimate contact with each other. The controller performs control such that the robot arm lifts the workpiece W and conveys the workpiece W to a desired location in a state where the workpiece W is being suctioned by the suction pad 112.

Here, the controller obtains in advance position information (foresight information) of the surface S1 to be suctioned (indicated by a dotted line) of the workpiece W placed on the table. On the basis of the foresight information, the controller controls the suction pad 112 to bring the suction surface of the suction pad 112 into intimate contact with the surface to be suctioned of the workpiece W in parallel.

However, the foresight information (position information and orientation information of the surface S1 to be suctioned of the workpiece W) obtained from an image or the like captured by a camera often includes an error. Here, the position information has three degrees of freedom including not only position information in a plane direction, but also position information in a vertical direction. The orientation information indicates the inclination of the surface S1 to be suctioned. The position and orientation of the surface S1 to be suctioned of the workpiece W indicated by the foresight information may not coincide with the actual position and orientation of the surface S2 to be suctioned of the workpiece W. In the situation shown in FIG. 4(*a*), for example, the left side of the workpiece W overlaps with the adjacent object, and is placed in a state in which it is lifted from the table. Accordingly, the actual surface to be suctioned of the workpiece W is positioned in S2 indicated by the solid line in FIG. 4(*a*). As a result, even if the controller tries to suction the workpiece W based only on the foresight information, the suction surface of the suction pad 112 and the actual surface S2 to be suctioned do not coincide with each other, and the suction surface of the suction pad 112 and the surface to be suctioned of the workpiece W do not come into contact with each other over the entire surface. Accordingly, if the suction pad 112 is controlled to suction the workpiece W in the above-described state, air leaks from a portion where the right side of the workpiece W and the suction pad 112 are not in contact with each other, and the suction pad 112 cannot normally pick up the workpiece W. As a result, an error of picking up the workpiece W occurs.

In contrast, the controller 5 of the present embodiment controls, after bringing the suction pad 112 closer to the workpiece W based on the foresight information, the movement of the suction pad 112 in accordance with the deformation of the suction pad 112. In FIG. 4(*b*), when the suction pad 112 and the surface to be suctioned of the workpiece W are brought into contact with each other at a contact point C, a part of the suction pad 112 is deformed. The controller 5 specifies the position of the contact point C, based on the deformation of the suction pad 112. When only a part of the suction pad 112 is deformed or the deformation is biased, the controller 5 detects that the suction surface of the suction pad 112 and the surface to be suctioned of the workpiece W are not in contact with each other (do not coincide with each other) over the entire surface. In this case, the controller 5 changes the inclination of the suction pad 112 while maintaining the contact between the suction pad 112 and the workpiece W at the contact point C. That is to say, the controller 5 changes the inclination of the suction pad 112 to reduce the angle formed by the suction surface of the suction pad 112 and the surface to be suctioned of the workpiece W with the contact point C as a fulcrum.

The controller 5 further controls the suction pad 112 to suction and pick up the workpiece W, when the suction pad 112 is uniformly deformed (the angle between the suction surface of the suction pad 112 and the surface to be suctioned of the workpiece W becomes zero) and the suction surface of the suction pad 112 and the surface to be suctioned of the workpiece W are in contact with each other over the entire surface.

As described above, when the controller 5 of the present embodiment is applied to a conveyance robot and the suction pad 112 that is attached to the distal end of the robot arm of the conveyance robot picks up an object placed on the table, the controller 5 specifies the position of the contact point C after the suction pad 112 has come into contact with one point of the surface to be suctioned of the object. Thereafter, the controller 5 controls the movement of the suction pad 112 so that the suction surface of the suction pad 112 and the surface to be suctioned of the object come into intimate contact with each other while maintaining the contact at the contact point C, and causes the suction pad 112 to suction the object. As a result, the object can be reliably picked up, and the risk of damaging the object due to a pick-up error can be prevented.

(2) Pressing an Object

Figure 5:
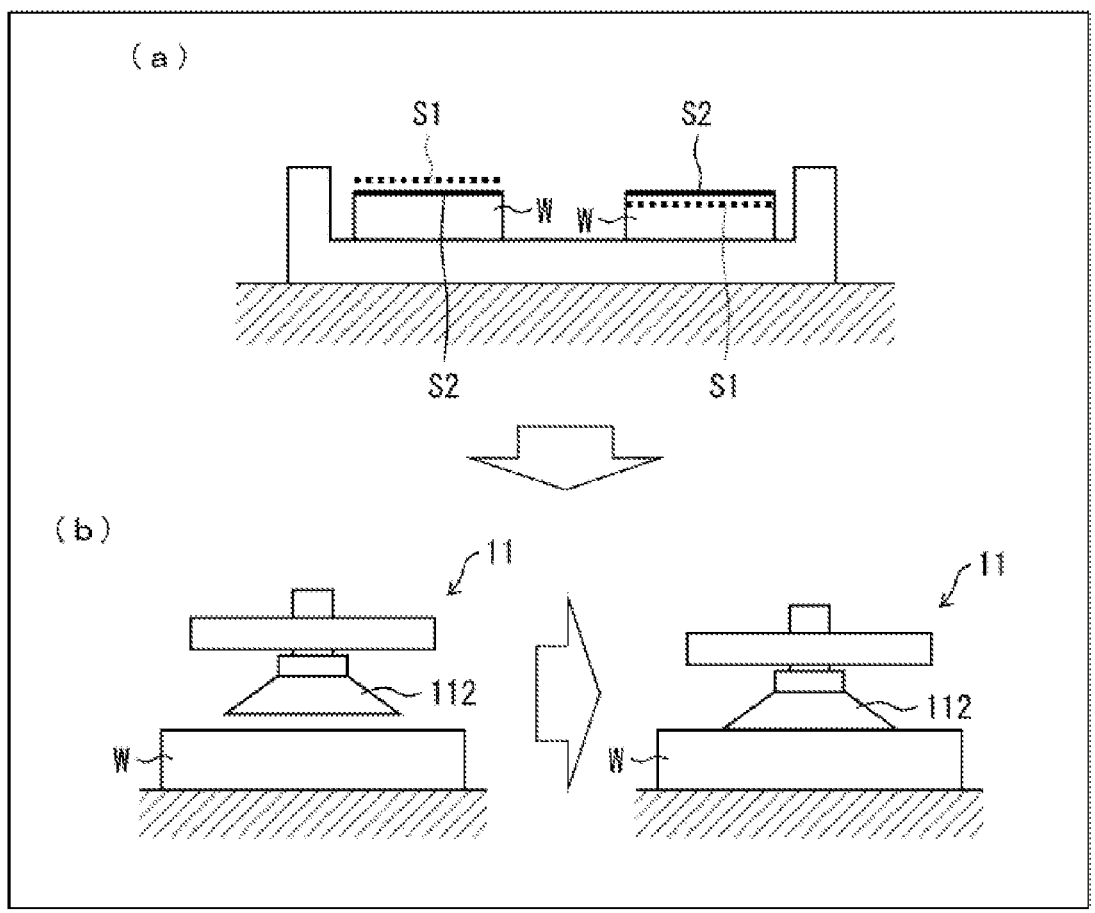
FIG. 5 is a diagram illustrating an example in which one or more embodiments is applied.

FIG. 5 shows a situation in which the suction pad 112 is pressed against the workpiece W placed on the table. FIG. 5(a) shows a state of pressing in the conventional example, and FIG. 5(b) shows a state of pressing in the application example of the present invention.

In FIG. 5(a), the controller of the conveyance robot lowers the robot arm including the suction pad 112 in the vertical direction, brings the suction pad 112 closer to the workpiece W placed on the table, and presses the upper surface of the workpiece W with an appropriate pressure. Thereafter, the controller stops lowering the suction pad 112.

Here, position information and orientation information (foresight information) of the upper surface S1 of the workpiece W normally placed on the table are stored in advance in the controller. The controller brings the suction pad 112 closer to the upper surface of the workpiece W based on the foresight information, and presses the suction pad 112 onto the workpiece W at an appropriate distance.

However, the actual upper surface S2 of the workpiece W may be lower than the upper surface S1 as shown on the left side of FIG. 5(a), or may be higher than the upper surface S1 as shown on the right side of FIG. 5(a). Accordingly, in the configuration in which the controller controls the suction pad 112 based only on the foresight information, if the actual upper surface S2 of the workpiece W is lower than the upper surface S1 as shown on the left side of FIG. 5(a), the suction of the suction pad 112 is started in a state where the suction pad 112 does not sufficiently press against the workpiece W. As a result, the amount of pressing (distance of pressing) is insufficient, and the pick-up of the workpiece W fails. On the other hand, as shown on the right side of FIG. 5(a), if the actual upper surface S2 of the workpiece W is higher than the upper surface S1, even if the suction pad 112 reaches the workpiece W, the suction pad 112 does not stop, and continues to press against the upper surface of the workpiece W. As a result, the amount of pressing is excessive, and there is a risk that the workpiece W and/or the suction pad 112 may be damaged.

In contrast, in the controller 5 of the present embodiment, as shown in FIG. 5(b), when the suction pad 112 is brought closer to the workpiece W, the position and the orientation of the suction pad 112 are corrected while observing the amount of pressing of the suction pad 112 with respect to the workpiece W. As a result, the amount of pressing of the suction pad 112 against the workpiece W can be kept constant.

(3) Placing an Object

Figure 6:
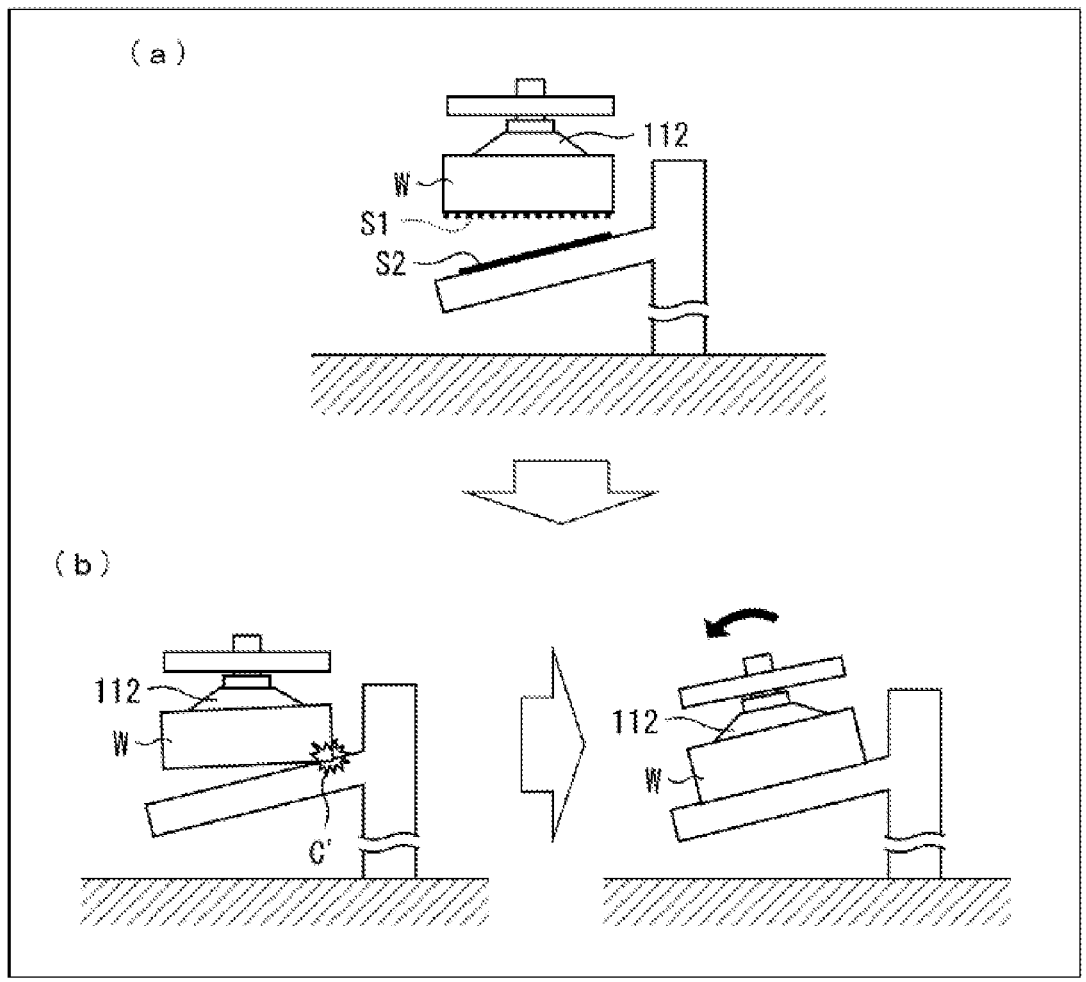
FIG. 6 is a diagram illustrating an example in which one or more embodiments is applied.

FIG. 6 shows a situation where the workpiece W that is in a state in which it is suctioned by the robot arm is placed on a table. FIG. 6(a) shows a state of placing an object in a conventional example, and FIG. 6(b) shows a state of placing an object in an application example of the present invention.

In FIG. 6(a), the controller lowers the robot arm in a state where the workpiece W is being suctioned by the suction pad 112 in the vertical direction to bring the workpiece W closer to the table. Then the suction of the suction pad 112 is released, and the workpiece W is placed on the surface of the table on which workpiece W is to be placed.

Here, the controller obtains in advance the position S1 of the surface of the table on which the workpiece W is to be placed as the foresight information. The controller of the conventional example determines, based on the foresight information, that the bottom surface of the workpiece W has reached the position S1, and the workpiece W and the surface of the table on which the workpiece W is to be placed have come into contact with each other over the entire surface. Thereafter, the controller performs control to release the suction of the suction pad 112, and place the workpiece W on the table.

However, in the situation shown in FIG. 6(a), the position S1 of the surface on which the workpiece W is to be placed that is obtained based on the foresight information does not coincide with the actual position S2 of the surface on which the workpiece W is to be placed. In this case, if the suction by the suction pad 112 is released and the workpiece W is placed when the bottom surface of the workpiece W reaches the position S1, the workpiece W is not placed at the correct position. Also, the workpiece W may fall to the actual position S2 of the surface on which the workpiece W is to be placed, and may be damaged. Furthermore, even if a part of the workpiece W comes into contact with the actual surface on which the workpiece W is to be placed, the lowering of the robot arm may be continued. As described above, the workpiece W and/or the suction pad 112 may be damaged.

In contrast, as shown in FIG. 6(b), the controller 5 of the present embodiment corrects the orientation of the suction pad 112 based on the deformation of the suction pad 112. In FIG. 6(b), the suction pad 112 is deformed when the workpiece W comes into contact with the contact point C' of the surface of the table on which the workpiece W is to be placed. The controller 5 specifies the position of the contact point C' based on the deformation of the suction pad 112. When the amount of deformation of a part of the suction pad 112 is changed or when the deformation is biased, the controller 5 detects that the lower surface of the workpiece W and the surface of the table on which the workpiece W is to be placed are not in contact with each other over the entire surface. In this case, the controller 5 changes the inclination of the suction pad 112 to reduce the angle formed by the surface of the suctioned workpiece W, which is not the suctioned surface (that is to say, lower surface of the workpiece W), and the surface of the table on which the workpiece W is to be placed. In other words, the controller 5 changes the inclination of the suction pad 112 to reduce the angle formed by the suction surface of the suction pad 112 and the surface of the table on which the object is to be placed, that is to say, to reduce the angle formed by the bottom surface of the workpiece W and the surface of the table on which the workpiece W is to be placed, with the contact point C' as a fulcrum. Note, that the controller 5 has information on the shape, the size, and the like of the workpiece W.

When the workpiece W that is suctioned by the suction pad 112 is to be placed on the surface of the table on which the workpiece W is to be placed, the controller 5 of the present embodiment specifies the position of the contact point C' after the lower surface of the workpiece W has come into contact with the surface of the table on which the workpiece W is to be placed at one point. Thereafter, the controller 5 controls the movement of the suction pad 112 so that the lower surface of the workpiece W and the surface of the table on which the workpiece W is to be placed come into intimate contact with each other while maintaining the contact at the contact point C', and then release the suction of the workpiece W. In this manner, the workpiece W can be placed at an appropriate position, and the object can be prevented from being damaged due to a misplacement.

2. Configuration Example

Mobile Suction Apparatus

Next, with reference to FIGS. 3(*a*) and 3(*b*), an example of a hardware configuration of the mobile suction apparatus 100 including the controller 5 according to the present embodiment will be described.

Figure 3:
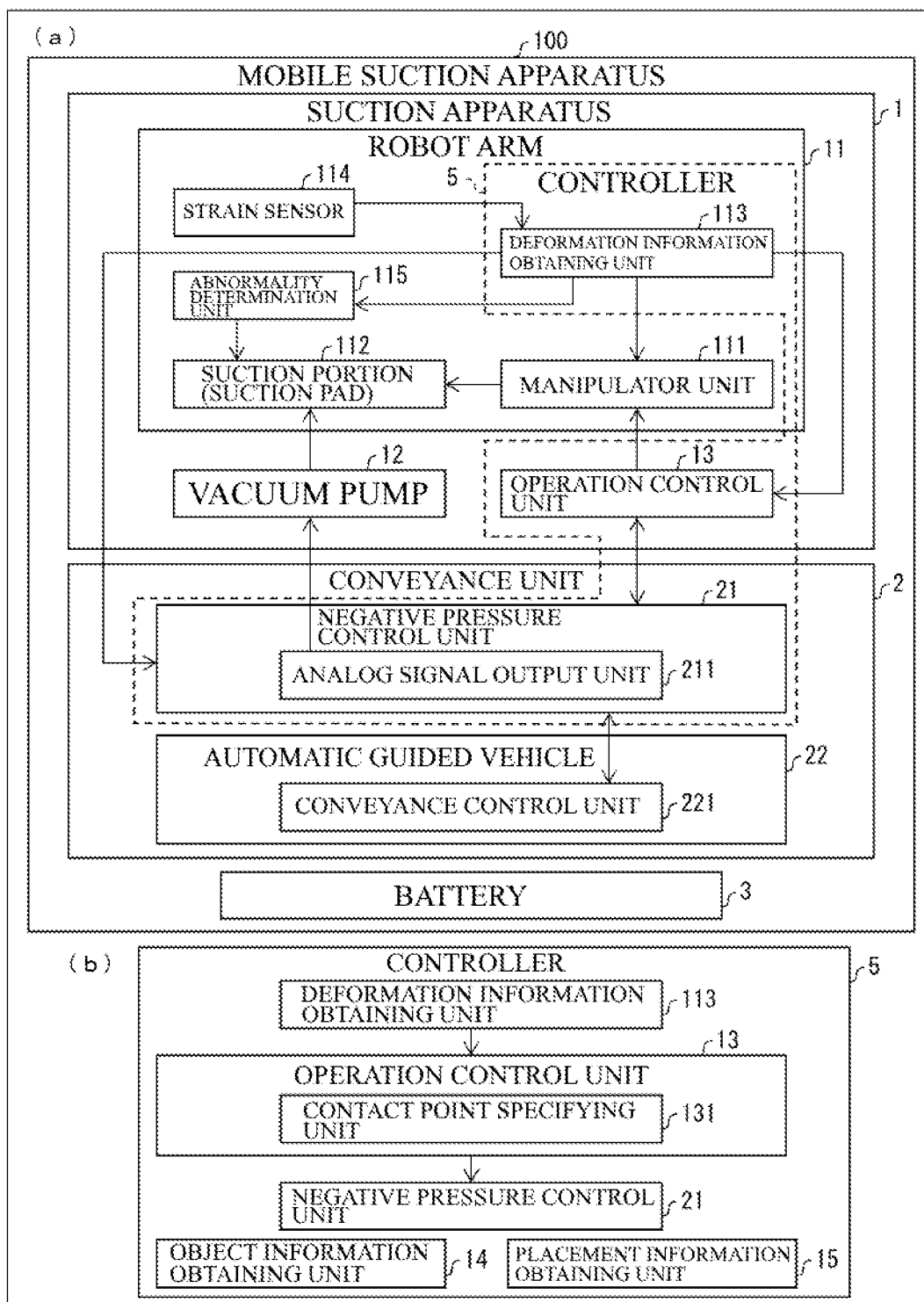
FIG. 3 is a schematic diagram illustrating an example of a hardware configuration of a mobile suction apparatus according to one or more embodiments.

FIG. 3 is a block diagram schematically illustrating an example of the configuration of the mobile suction apparatus 100 according to the present embodiment. In the example shown in FIG. 3, the mobile suction apparatus 100 according to the present embodiment includes a suction apparatus 1, a conveyance unit 2, and a battery 3.

Suction Apparatus

The suction apparatus 1 includes a robot arm 11, a vacuum pump 12, and an operation control unit (manipulator control unit) 13.

Robot Arm

In the example shown in FIG. 2, the robot arm 11 includes a manipulator unit 111, a suction pad 112, a deformation information obtaining unit 113, and the operation control unit.

Manipulator Unit

The manipulator unit 111 is driven together with the suction pad 112 of the robot arm 11, under the control of the operation control unit 13. The manipulator unit 111 includes, for example, one or more joints.

Suction Pad

When the suction pad 112 is positioned at the work position by the driving of the manipulator unit 111, the suction pad 112 performs an operation of gripping an object by suctioning the object with negative pressure corresponding to the amount of driving of the vacuum pump 12.

Deformation Information Obtaining Unit

The deformation information obtaining unit 113 obtains information on deformation of the suction pad 112. The deformation information obtaining unit 113 obtains, for example, data indicating strain of the suction pad 112 from the strain sensor 114. The deformation information obtaining unit 113 specifies the amount of deformation of the suction pad 112 based on the data indicating the strain. A specific example of the amount of deformation will be described later.

As illustrated in the examples of FIGS. 2 and 3, the deformation information obtaining unit 113 may also obtain information on deformation at a plurality of locations in the suction pad 112 from a plurality of strain sensors 114*a*, 114*b*, and 114*c*. However, in the present embodiment, there is no particular limitation to the deformation information obtaining unit 113 as long as the deformation information obtaining unit 113 can obtain information on deformation of the suction pad 112. In the present embodiment, the deformation information obtaining unit 113 may also obtain the deformation information from, for example, one or more sensors disposed on or built in the suction pad 112. Because the sensor is disposed on or built in the suction pad 112, the deformation of the suction pad 112 can be suitably detected. When the sensor is built in the suction pad 112, as shown in the example of FIG. 2, the sensor can be built in the suction pad 112 corresponding to the place of the suction pad 112 where the strain sensor 114 is disposed. Examples of the sensor that is built in the suction pad 112 include a strain gauge sensor and a pressure-sensitive conductive sensor that is made of rubber or resin containing a conductive material such as carbon nanotubes and carbon particles.

As an example, the deformation information obtaining unit 113 may also obtain deformation information from one or more optical displacement meters (distance sensors such as laser displacement meters) or shape measurement sensors, instead of the strain sensor 114. In the example of FIG. 2, for example, one or more optical displacement meters or shape measurement sensors are disposed on the suction pad 112 similarly to the strain sensors 114. Also, as shown in the example of FIG. 2(*b*), the optical displacement meter or the shape measurement sensor detects the light reflected by the suction pad 112 and measures the amount of displacement of the suction pad 112, so that the deformation of the suction pad 112 can be suitably detected (measure the shape change). In particular, even in a case where one two-dimensional shape measurement sensor is disposed on the suction pad 112, the two-dimensional shape measurement sensor can detect deformation at a plurality of locations in the suction pad 112. Examples of the optical displacement meter include a low-cost single-distance displacement sensor. Examples of the shape measurement sensor include a two-dimensional shape measurement sensor that is a smart sensor.

As another example, the deformation information obtaining unit 113 may also include a proximity sensor, instead of the strain sensor 114. When the deformation information obtaining unit 113 includes a proximity sensor, for example, one or more proximity sensors are disposed on the suction pad 112 in the same manner as the strain sensors 114 illustrated in FIG. 2. Also, the proximity sensor can preferably detect the deformation of the suction pad 112 (measure the shape change) by measuring the amount of displacement of the distance between the proximity sensor and the suction pad 112. Examples of the proximity sensor include an ultrasonic sensor, an inductive proximity sensor, a capacitive proximity sensor, and an optical proximity sensor.

Alternatively, the deformation information obtaining unit 113 may also obtain information on the amount of deformation, the speed of deformation, or the acceleration of deformation from a sensor capable of detecting deformation of the suction portion 112, such as the strain sensor 114, as the information on deformation. In this case, the strain sensor 114 performs a process for obtaining the amount of deformation, the speed of deformation, or the acceleration of deformation.

The deformation information obtaining unit 113 outputs deformation data such as the amount of deformation, the speed of deformation, or the acceleration of deformation of the suction pad 112 to the manipulator control unit 13 and the negative pressure control unit 21.

Abnormality Determination Unit

An abnormality determination unit 115 determines that the object is stuck to the suction pad 112, if the amount of deformation of the suction pad 112 after a predetermined period of time has elapsed since the suction pad 112 stopped suctioning the object and has separated the object is greater than or equal to a second threshold value. In other words, the abnormality determination unit 115 determines that the object is stuck to the suction pad 112, if the amount of deformation of the suction pad 112 after a predetermined period of time has elapsed since the space between the suction pad 112 and the object is no longer in the vacuum state (that is to say, the vacuum is broken) is greater than or equal to the second threshold value.

In this case, the abnormality determination unit 115 can issue an alert or cause the suction pad 112 to perform an operation of dropping the object (placing operation). In this manner, it is possible to prevent a failure of the placement due to the fact that the object does not separate from the suction pad 112 because it is stuck to the suction pad 112 after a vacuum breakdown.

Vacuum Pump

The vacuum pump 12 generates negative pressure according to the amount of driving, and provides the negative pressure to the suction pad 112. Here, an example in which the suction apparatus 1 in the mobile suction apparatus 100 includes the vacuum pump 12 will be described. In the present embodiment, the suction apparatus 1 in the mobile suction apparatus 100 may not include the vacuum pump 12, and for example the vacuum pump 12 may also be provided outside the suction apparatus 1 and the mobile suction apparatus 100. Also with this configuration, the negative pressure control unit 21 controls the amount of driving of the vacuum pump 12, so that the same effects as those of the above-described example can be achieved.

Operation Control Unit

The operation control unit 13 includes a central processing unit (CPU), a random access memory (RAM), a read only memory (ROM), or the like, and preforms control in response to an information process. The manipulator control unit 13 controls the manipulator unit 111 of the robot arm 11, based on the manipulator control signal output from the negative pressure control unit 21. In this manner, the manipulator control unit 13 moves the suction pad 112 using the manipulator unit 111. Specifically, the manipulator control unit 13 drives the manipulator unit 111 so that the suction pad 112 of the robot arm 11 is positioned at a work position where the suction pad 112 can suction the object. Also, the manipulator control unit 13 may also operate the manipulator unit 111 so that the angle of the suction pad 112 with respect to the object reaches a predetermined angle after the suction pad 112 is positioned at the work position. In this manner, the position of the suction pad 112 can be finely adjusted to a more suitable position. In addition, after the suction pad 112 has suctioned the object, the manipulator control unit 13 drives the manipulator unit 111 so that, for example, the suction pad 112 of the robot arm 11 is positioned at the position of a predetermined box (not illustrated) installed on the upper portion of the manipulator control unit 13.

Furthermore, the manipulator control unit 13 may also determine the direction in which the suction pad 112 is moved to suction the object again, based on a plurality of amounts of deformation at a plurality of positions in the suction pad 112.

In the pick-up operation (suction operation) of the object by the suction pad 112, the mobile suction apparatus 100 measures the positional relationship between the object and the mobile suction apparatus 100 by two-dimensional vision, three-dimensional vision, or the like, and the suction pad 112 performs the pick-up operation of the object, in order to prevent variation in the stop position of the mobile suction apparatus 100 after traveling of the mobile suction apparatus 100. In this case, there is a risk that an error in picking up the object by the suction pad 112 may occur due to a measurement error in the positional relationship between the object and the mobile suction apparatus 100.

In contrast, with the above-described configuration, even when the suction pad 112 is not in intimate contact with the object, the suction pad 112 can be moved in the direction in which the object is suctioned again. As a result, it is possible to prevent an error of picking up the object with the suction pad 112.

If the amount of deformation of the first portion is larger than the amount of deformation of the second portion among the plurality positions of the suction pad 112, the manipulator control unit 13 may also move the suction pad 112 to the first portion side (the side opposite to the placement position of the sensor that has detected the smaller amount of deformation) from the second portion, in order to suction the object again. In this manner, it is possible to suction position of the suction pad 112 from being misaligned. As a result, it is possible to better prevent an error of picking up the object with the suction pad 112.

Conveyance Unit

The conveyance unit (automated guided vehicle) 2 includes a negative pressure control unit (control signal output unit) 21 and an automated guided vehicle 22.

Negative Pressure Control Unit

The negative pressure control unit 21 includes a central processing unit (CPU), a random access memory (RAM), a read only memory (ROM), or the like, and preforms control in response to an information process. The negative pressure control unit 21 includes, for example, a programmable logic controller (PLC) or a microcontroller. The negative pressure control unit 21 controls the vacuum pump 12 that generates negative pressure, based on an output signal received from one or more strain sensors 114 of the deformation information obtaining unit 113 and a conveyance state signal received from the conveyance control unit 221 of the automated guided vehicle 22.

The negative pressure control unit 21 controls ON and OFF of the vacuum pump 12 based on a signal that is output from the operation control unit 13. If it is determined from the deformation of the suction pad 112 that the suction pad 112 has sufficiently pressed the object when picking up the object, for example, the negative pressure control unit 21 turns ON the vacuum pump. Also, when the object is to be placed on the table, if the operation control unit 13 determines that the entire bottom surface of the object is in contact with the surface of the table on which the object is to be placed, the negative pressure control unit 21 turns OFF the vacuum pump.

In addition, the negative pressure control unit 21 outputs a manipulator control signal for causing the manipulator control unit 13 to control the manipulator unit 111.

Furthermore, the negative pressure control unit 21 may also include an analog signal output unit 211 that outputs an analog signal as a control signal for the vacuum pump 12. The analog signal output unit 211 may also perform control to monotonically increase or monotonically decrease the analog signal. In this manner, the amount of driving of the vacuum pump 12 can be changed in a slope shape, so that a rush current can be reduced. In addition, power consumption can be reduced and control can be stabilized.

Automated Guided Vehicle

In the example of FIG. 3, the automated guided vehicle 22 includes a conveyance control unit 221. The conveyance control unit 221 controls the movement (conveyance) of the mobile suction apparatus 100 by controlling the conveyance of the automated guided vehicle 22. The conveyance control unit 221 moves, for example, the mobile suction apparatus 100 to a work position where the robot arm 11 can grip the object. Also, when the mobile suction apparatus 100 has already been positioned at the work position, the conveyance control unit 221 does not move the mobile suction apparatus 100. In addition, the automated guided vehicle 22 transmits a conveyance state signal, which is a signal indicating the conveyance state of the automated guided vehicle 22, to the negative pressure control unit 21.

Battery

The battery 3 controls the units of the mobile suction apparatus 100, that is to say, the suction apparatus 1 and the conveyance unit 2, by supplying power to these units of the mobile suction apparatus 100.

In the above example, the mobile suction apparatus 100 is configured to operate with the battery 3, but there is no limitation to this configuration. In the present embodiment, the mobile suction apparatus 100 may also be configured such that power is supplied from the outside of the mobile suction apparatus 100 through a power cord.

Controller

As described above, the controller 5 includes the deformation information obtaining unit 113 that obtains information on the deformation of the suction pad 112, and the operation control unit 13 that controls the movement of the suction pad 112 in accordance with the deformation of the suction pad 112. In other words, the operation control unit 13 changes the movement (movement direction, speed, and/or inclination) of the suction pad 112 in accordance with the deformation of the suction pad 112.

The controller 5 further includes an object information obtaining unit 14 that obtains information about an object, and a placement information obtaining unit 15 that obtains information about a table on which the object is to be placed.

The controller 5 may be provided in the mobile suction apparatus 100, or may also be provided separately from the mobile suction apparatus. The controller 5 may also be configured to be capable of communicating with the mobile suction apparatus, and to transmit a control signal for controlling the mobile suction apparatus to the mobile suction apparatus, for example.

Operation Control Unit

The operation control unit 13 may further include a contact point specifying unit 131. The contact point specifying unit 131 specifies a contact point where the suction pad 112 contacts the object, based on the deformation (amount of deformation, speed of deformation, or acceleration of deformation) of the suction pad 112. In addition, the contact point specifying unit 131 specifies a contact point where the object contacts the surface on which the object is to be placed, based on the deformation (amount of deformation, speed of deformation, or acceleration of deformation) of the suction pad 112 in a state where the suction pad 112 is suctioning the object. According to the above configuration, even if there is a measurement error in the position and orientation relationship between the object and the mobile suction apparatus 100, the measurement error can be canceled by the manipulator control unit 13 causing the manipulator unit 111 to tilt the orientation of the suction portion (suction pad) 112 toward the suction surface side taking the contact point that is specified by the contact point specifying unit 131 as a fulcrum. As a result, it is possible to better prevent an error of picking up the object by the suction portion 112. This will be described in detail later.

3. Operation Examples

Hereinafter, various operation examples of the controller 5 according to the present invention will be described.

Before describing specific operation examples, the definition of the amount of deformation of the suction pad 112 will be described.

Definition of Amount of Deformation of Suction Pad 112

Next, the definition of the amount of deformation of the suction pad 112 will be described with reference to FIGS. 7 and 8.

Figure 7:
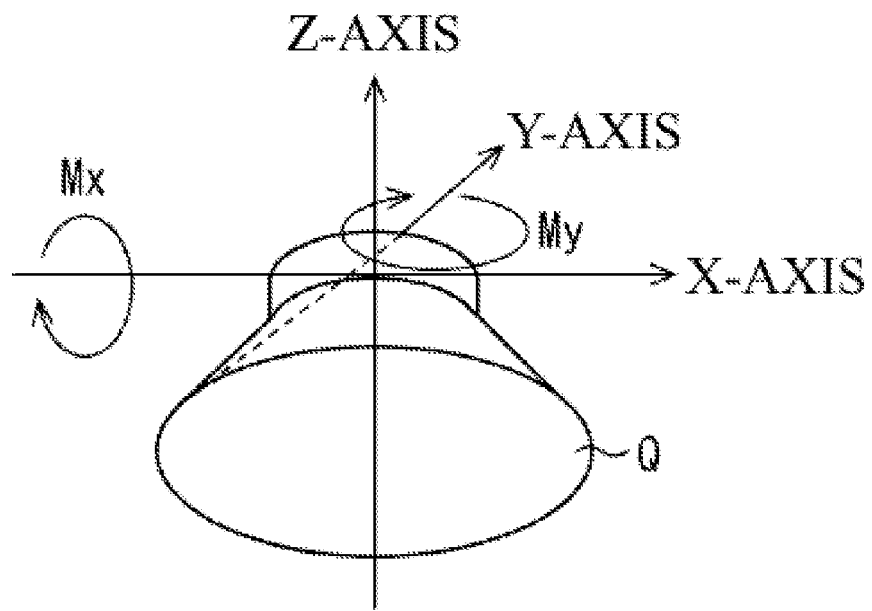
FIG. 7 is a diagram illustrating a definition of an amount of deformation of a suction pad that is used in one or more embodiments.

FIG. 7 is a diagram illustrating the definition of the amount of deformation of the suction pad that is used in the embodiment of the present invention. First, the definition 1 of the amount of deformation of the suction pad 112 will be described with reference to FIG. 7.

As described above, the suction pad 112 has a substantially conical shape whose lower side (suction surface) Q is open. Here, a plane including a circular end portion of the suction pad 112 that is to be brought into contact with an object is referred to as "suction surface". Also, the X-axis and the Y-axis extend in two directions perpendicular to each other and parallel to the suction surface of the suction pad when it is not deformed, and the Z-axis extends in a direction normal to the suction surface of the suction pad when it is not deformed. In the definition 1 of the amount of deformation of the suction pad 112, the inclination of the suction surface of the suction pad 112 is represented by the amount of rotation Mx about the X-axis and the amount of rotation My about the Y-axis. In the definition 1, the amount of deformation of the suction pad 112 is represented by Mx, My, and the amount of pressing Z in the Z-axis direction.

Figure 8:
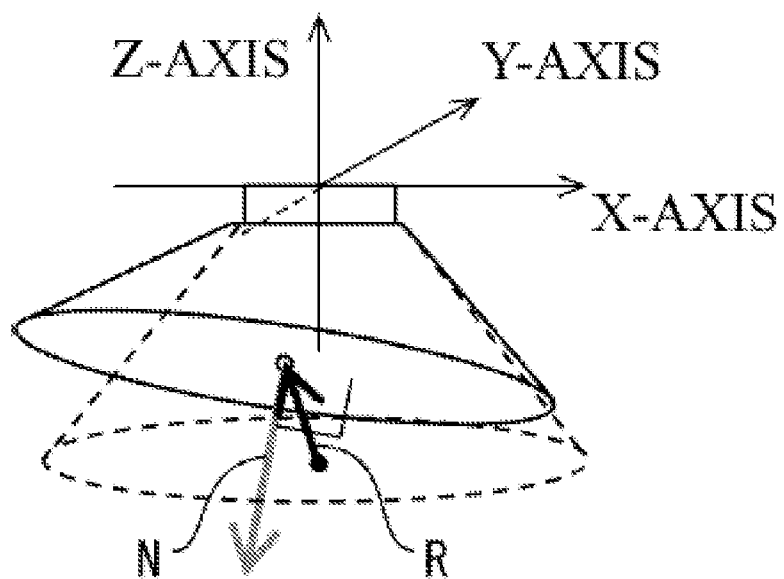
FIG. 8 is a diagram illustrating another definition of an amount of deformation of a suction pad that is used in one or more embodiments.

FIG. 8 is a diagram illustrating the definition of the amount of deformation of the suction pad that is used in the embodiment of the present invention. Next, a definition 2 of the amount of deformation of the suction pad 112 will be described with reference to FIG. 8.

A vector connecting the center of the suction surface of the suction pad when it is not deformed and the center of the suction surface of the suction pad when it is deformed is defined as R. In addition, the unit normal vector on the suction surface of the suction pad when it is deformed is defined as N. In the definition 2, the projection of the vector N onto the X-axis is denoted by ex, the projection of the vector N onto the Y-axis is denoted by ey, and the projection of the vector R onto the Z-axis is denoted by ez. In other words, in the definition 2, the X-axis component of the vector N is ex, the Y-axis component of the vector N is ey, and the Z-axis component of the vector R is ez. In the definition 2, the amount of deformation of the suction pad 112 is represented by {ex, ey, ez}.

As for the amount of deformation of the suction pad 112, an equivalent amount of information can be obtained by the definition 1 and the definition 2, but the definition 2 is used in the following description.

Hereinafter, with reference to FIGS. 10 to 16, operations such as picking up and placing of the workpiece W by the mobile suction apparatus 100 installed in the controller 5 of the present invention will be described.

Operation Example 1

Figure 10:
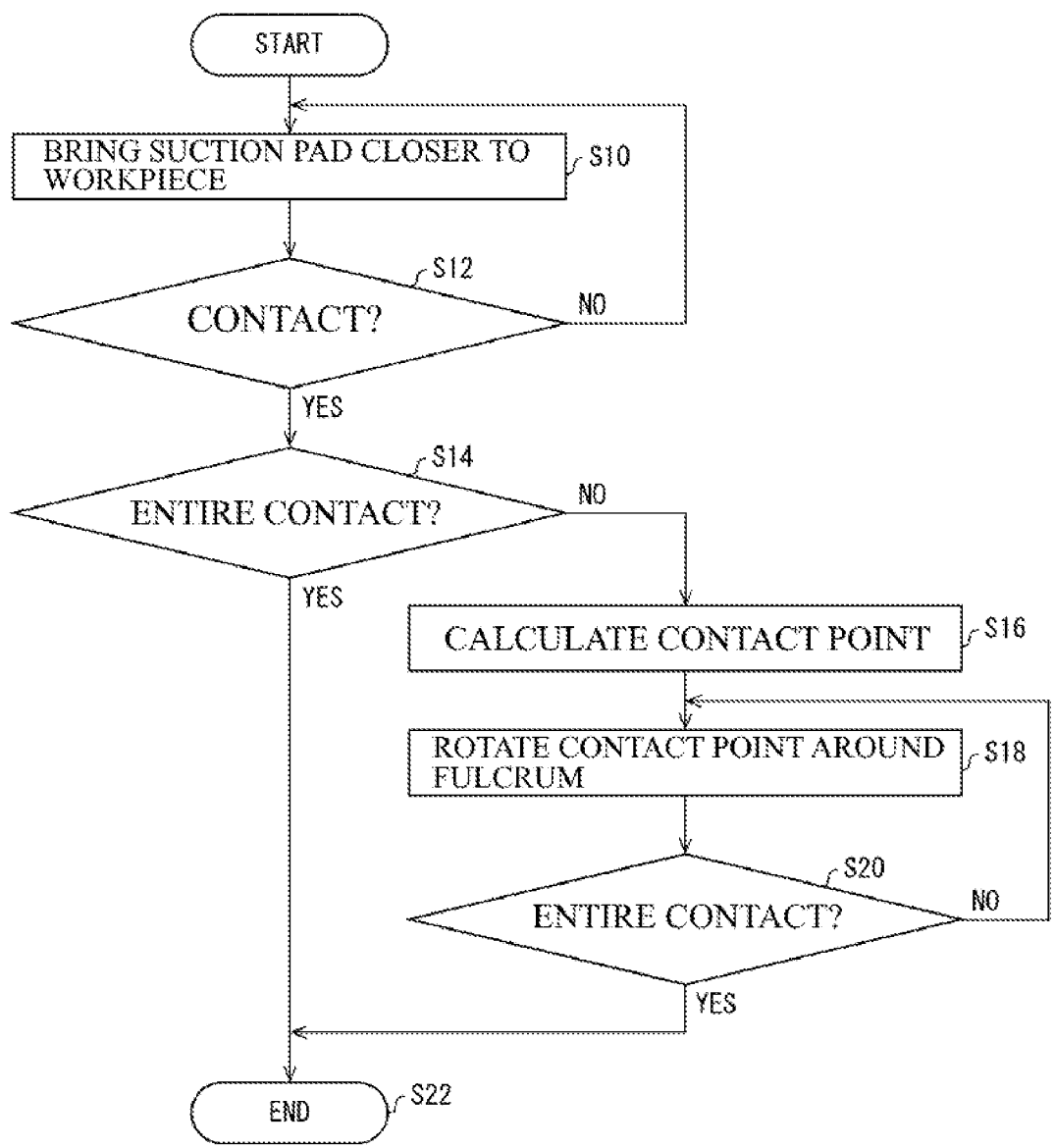
FIG. 10 is a flowchart illustrating an operation of a controller 5 in one or more embodiments.

FIG. 10 is a flowchart showing the operation of the controller 5 in the embodiment of the present invention. First, with reference to FIG. 10, an operation example in which the suction pad 112 suctions a workpiece W and picks up the workpiece W will be described.

Step S10

First, in step S10, the operation control unit 13 causes the suction pad 112 to approach the workpiece W by lowering the suction pad 112 in the vertical direction.

Step S12

Next, in step S12, the operation control unit 13 determines whether or not at least a part of the suction pad 112 has come in contact with the workpiece W. When the suction pad 112 has come into contact with the workpiece W, the suction pad 112 is inclined in the X and Y directions, and the amount of inclination of the suction pad 112 represented by the absolute value of the vector (ex, ey) exceeds a threshold value ε1 or the amount of pressing ez in the Z-axis direction exceeds a threshold value ε2. Accordingly, the following expression is satisfied:

$|(ex, ey)| > \varepsilon 1$, or $ez > \varepsilon 2$

Therefore, more specifically, in this step, the operation control unit 13 determines that the suction pad 112 has come into contact with the workpiece W if the above expression is satisfied, and otherwise determines that the suction pad 112 has not come into contact with the workpiece W.

If the operation control unit 13 determines that the suction pad 112 has come into contact with the workpiece W (YES in step S12), the process proceeds to step S14.

If the operation control unit 13 does not determine that the suction pad 112 has not come into contact with the workpiece W (NO in step S12), the process returns to step S10 and the operation control unit 13 continues the approach of the suction pad 112 to the workpiece W.

Step S14

Next, in step S14, the operation control unit 13 determines whether or not the suction pad 112 and the workpiece W are entirely in contact with each other. When the suction pad 112 is entirely in contact with the workpiece W, the inclination of the suction pad 112 is eliminated, so that the following expression is satisfied.

$|(ex, ey)| < \varepsilon 1$

Therefore, in this step, the operation control unit 13 determines that the suction surface of the suction pad 112 is entirely in contact with the workpiece W if the above expression is satisfied, and otherwise determines that the suction surface of the suction pad 112 is not entirely in contact with the workpiece W.

If the operation control unit 13 determines that the suction surface of the suction pad 112 and the workpiece W are entirely in contact with each other (YES in step S14), the operation control unit 13 completes the control of the inclination of the suction pad 112 and shifts to the control of the amount of pressing described later.

If the operation control unit 13 does not determine that the suction surface of the suction pad 112 and the workpiece W are entirely in contact with each other (NO in step S14), the process proceeds to step S16.

Step S16

In step S16, the contact point specifying unit 131 specifies the position of the contact point C between the suction pad 112 and the workpiece W, based on the deformation of the suction pad 112.

Figure 9:
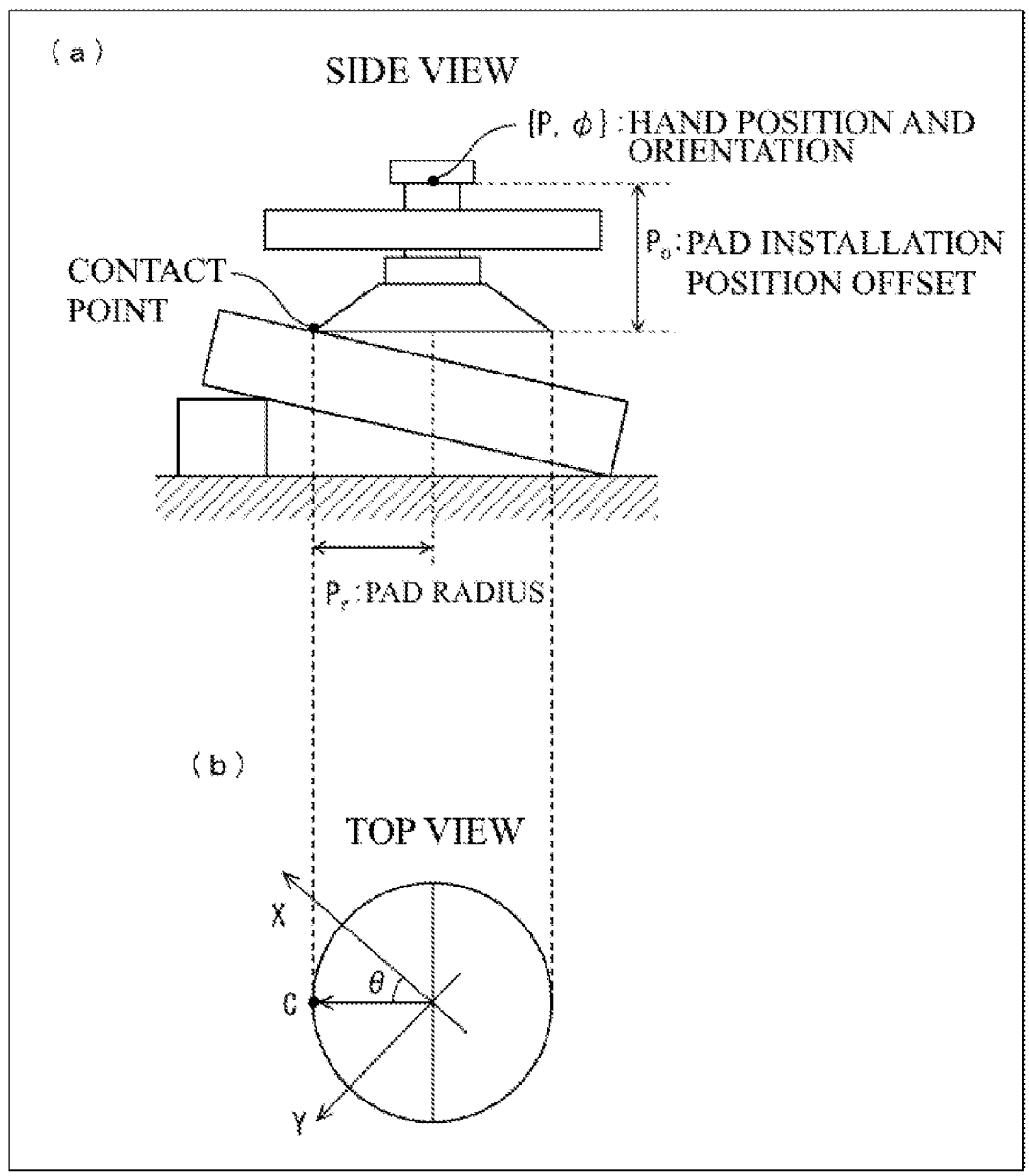
FIG. 9 is a diagram illustrating orientation control of a suction pad according to one or more embodiments.

FIG. 9(a) is a side view of the suction pad 112, and FIG. 9(b) is a top view of the suction pad 112. Here, with reference to FIG. 9, a process of specifying the position of the contact point C between the suction pad 112 and the workpiece W that is performed by the contact point specifying unit 131 will be described with reference to FIG. 9. Letting an angle formed by a projection of the inclination (vector N) of the suction pad 112 onto the XY plane and the X-axis be θ, θ is obtained from the following expression.

$\theta = \arctan(ey/ex)$

The contact point specifying unit 131 specifies a contact point C between the suction pad 112 and the workpiece W based on θ.

Once the contact point is specified, the process proceeds to step S18.

Step S18

In step S18, the operation control unit 13 changes the inclination of the suction pad 112 while maintaining the contact between the suction pad 112 and the workpiece W at the specified contact point C. That is to say, the operation control unit 13 changes the inclination of the suction pad 112 to reduce the angle between the suction surface of the suction pad 112 and the surface to be suctioned of the workpiece W. Here, the operation control unit 13 obtains, by the following process, an operation command of the manipulator unit 111 in a case where the inclination of the suction pad 112 is changed to align the suction surface of the suction pad 112 with the surface to be suctioned of the workpiece W while maintaining the contact at the contact point.

The suction pad 112 is attachable to and detachable from the robot arm. The operation control unit 13 calculates a command speed (Pv) and a command angular velocity (φω) for controlling the position and the angle (orientation) of the conveyance hand, which is the base of the suction pad 112, as a combination (simple sum) of the following two command values. The command angular velocity (φω) is a change speed of the angle of the conveyance hand.

1. A command speed Pv (more specifically, a command speed vector) for maintaining the contact between the suction pad 112 and the workpiece W at the contact point C.

$Pv = (Pvr - Gv \cdot ez)h$

Here, Pvr is the target speed of the suction pad 112, Gv is a constant gain, ez is the Z-axis component of the normal vector R representing the inclination of the suction pad 112, and h is the direction vector of the hand orientation (φ). Also, "·" represents multiplication.

2. Command speed (Pv) and command angular velocity (φω) for rotating suction pad 112 with contact point C as fulcrum The contact point is set for an extended hand, and the position and the orientation of the contact point is set as {Pe, φe}. Because ex and ey are very small in step S18, it is assumed that φe=φ. {Pe, φe} is expressed as follows using the pad installation position offset (Po), the pad radius (Pr), θ that is obtained in step S16, and the original hand position and orientation {P, φ} in FIG. 9.

$$\{Pe, \varphi e\} = FK(\{P, \varphi e\}, \{Po, Pr, \theta\})$$

Here, Pe is the center of rotation, Po is the offset of the suction pad installation position (the distance between the center of the suction surface of the suction pad 112 and the position of the conveyance hand), and Pr is the radius of the suction pad 112. FK is a kinematics function for obtaining {Pe, φe} from {P, φ}. The inverse kinematics function IK corresponding to FK exists, and is set as follows.

$$\{P, \varphi\} = IK(\{Pe, \varphi e\}, \{Po, Pr, \theta\})$$

Assuming that Pe is the rotation center, and a command that gives rotation on a plane that passes through Pe and the central axis of the suction pad 112 is {Pev, φev}, the operation control unit 13 determines {Pv, φω} using the above IK or Jacobian derived from the IK. This set is defined as a command speed and a command angular velocity.

As described above, the operation control unit 13 changes the inclination of the suction pad 112 in accordance with the obtained command speed. Thereafter, the process proceeds to step S20.

Step S20

In step S20, the operation control unit 13 determines whether or not the suction pad 112 and the workpiece W are entirely in contact with each other. More specifically, the operation control unit 13 performs the determination through the same process as that in step S14 described above. If the operation control unit 13 determines that the suction surface of the suction pad 112 and the workpiece W are entirely in contact with each other (YES in step S20), the operation control unit 13 completes the control of the inclination of the suction pad 112 and shifts to the control of the amount of pressing. If the operation control unit 13 does not determine that the suction surface of the suction pad 112 and the workpiece W are entirely in contact with each other (NO in step S20), the process returns to step S18, and the operation control unit 13 continues to control the inclination of the suction pad 112.

According to the above operation example, after the suction pad 112 has come into contact with the workpiece W, the operation control unit 13 specifies the position of the contact point C and the inclination of the suction pad 112, and changes the inclination of the suction pad 112 to bring the suction pad 112 into intimate contact with the surface to be suctioned of the workpiece W while maintaining the contact at the contact point C. Therefore, the orientation of the suction pad 112 can be accurately corrected, and the workpiece W can be reliably picked up.

Operation Example 2

Figure 11:
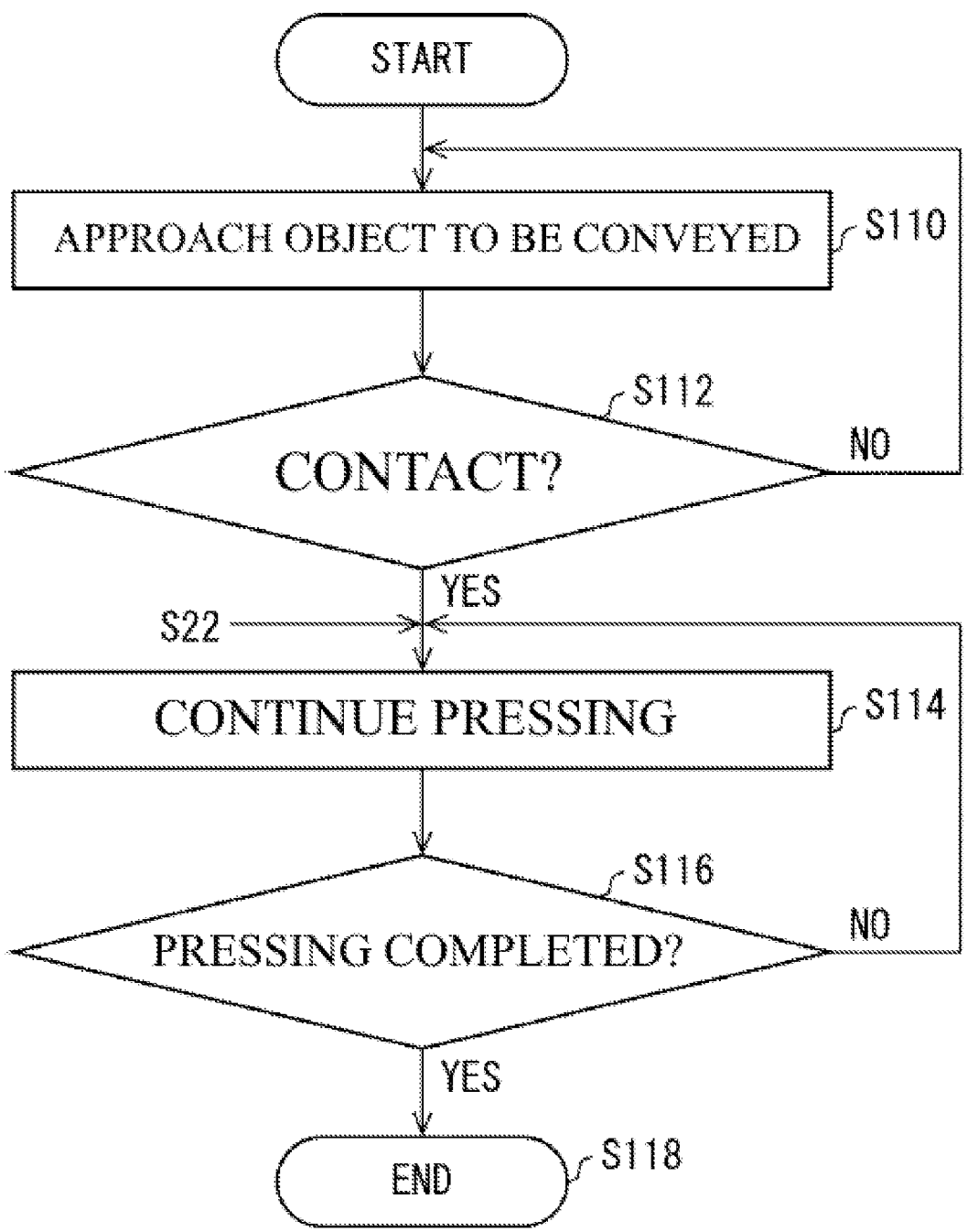
FIG. 11 is a flowchart illustrating an operation of a controller 5 in another embodiment of the present invention.

FIG. 11 is a flowchart showing the operation of a controller 5 in another embodiment of the present invention. Next, with reference to FIG. 11, an operation example in a case where the suction pad 112 presses the workpiece W before suctioning or placing an object will be described.

Step S110

First, in step S110, the operation control unit 13 causes the suction pad 112 to approach the workpiece W by lowering the suction pad 112 in the vertical direction.

Step S112

Next, in step S112, the operation control unit 13 determines whether or not the suction pad 112 has come into contact with the workpiece W, based on the amount of deformation of the suction pad 112.

If the operation control unit 13 determines that the suction pad 112 has come into contact with the workpiece W based on the amount of deformation of the suction pad 112 (YES in step S112), the process proceeds to step S114. If the operation control unit 13 does not determine that a part of the suction pad 112 has come into contact with the workpiece W (NO in step S112), the process returns to step S110 and the operation control unit 13 continues the approach of the suction pad 112 to the workpiece W.

Step S114

Next, in step S114, the operation control unit 13 continues to press the suction pad 112 onto the workpiece W. At this time, the operation control unit 13 may also change the speed of the suction pad 112 in accordance with the deformation of the suction pad 112. If the amount of deformation (amount of pressing ez) of the suction pad 112 exceeds a first threshold value, the operation control unit 13 may also reduce the speed at which the suction pad 112 is brought closer to the workpiece W. That is to say, the operation control unit 13 may also reduce the speed of the suction pad 112 in step S114 with respect to the speed of the suction pad 112 in step S110. Thereafter, the process proceeds to step S116.

Step S116

In step S116, the operation control unit 13 determines whether or not the pressing of the suction pad 112 onto the workpiece W is completed. In this step, letting the threshold value of the amount of pressing ez of the suction pad 112 against the workpiece W be ε2, the operation control unit 13 determines that the amount of pressing is sufficient if the following expression is satisfied, and otherwise does not determine that the amount of pressing is sufficient.

$$ez > \varepsilon 2$$

Then, if the operation control unit 13 determines that the pressing of the suction pad 112 onto the workpiece W is completed (YES in step S116), the operation control unit 13 stops the movement of the suction pad 112. At this time, for example, if the amount of deformation of the suction pad 112 exceeds a second threshold value that is larger than the first threshold value, the operation control unit 13 may also stop the operation of bringing the suction pad 112 closer to the workpiece W.

When the pressing control is ended, the operation control unit 13 turns ON the vacuum pump 12 and starts suction of the object. If the deformation information obtaining unit 113 does not determine that the pressing of the suction pad 112 onto the workpiece W is completed (NO in step S116), the process returns to step S114 to continue the pressing.

In the above operation example, the deformation information obtaining unit 113 observes the amount of pressing of the suction pad 112 onto the workpiece W based on the amount of deformation of the suction pad 112, and determines whether or not to continue the pressing. Therefore, because the amount of pressing ez onto the workpiece W can be kept within a certain range, the suction pad 112 can be pressed onto the workpiece W as appropriate when the workpiece W is picked up or placed.

Operation Example 3

Figure 12:
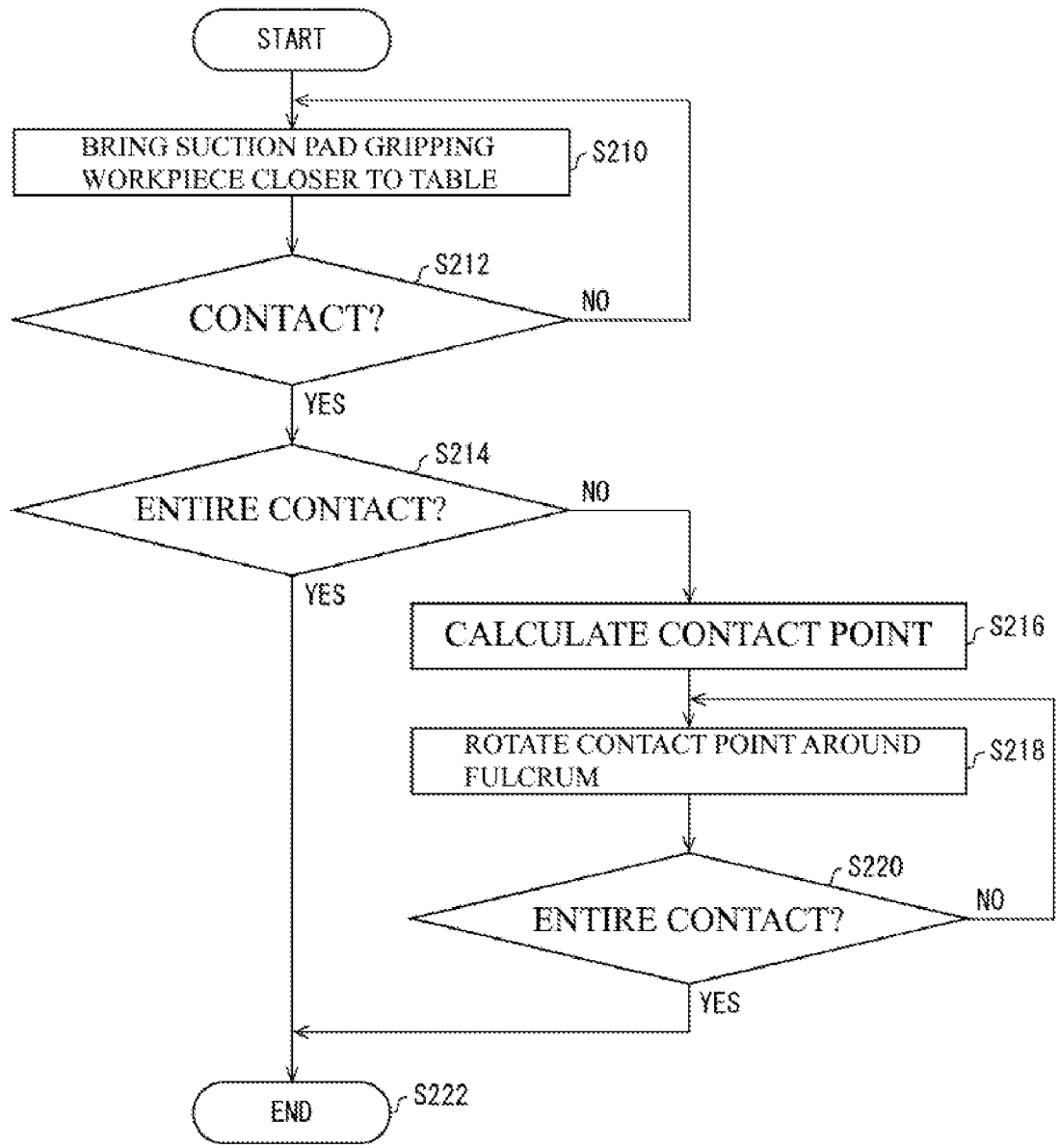
FIG. 12 is a flowchart illustrating an operation of a controller 5 in still another embodiment of the present invention.

Next, with reference to FIG. 12, an operation example when the suction pad 112 that is gripping the workpiece W places the workpiece W on the table will be described.

Step S210

First, in step S210, the operation control unit 13 causes the suction pad 112 (the workpiece W) to approach the table by lowering the suction pad 112 in the vertical direction.

Step S212

Next, in step S212, the operation control unit 13 determines whether or not a part of the workpiece W that is gripped by the suction pad 112 has come into contact with the table at the contact point C. Here, the operation control unit 13 basically performs the same process as the process in step S12 in the operation example 1 described above. Due to the suction and the weight of the workpiece W, the amount of deformation {ex0, ey0, ez0} of the suction pad 112 before the workpiece W has come into contact with the table is not zero. The operation control unit 13 records the amount of deformation {ex0, ey0, ez0} of the suction pad 112 before the workpiece W has come into contact with the table. Then, if the following expression is satisfied, the operation control unit 13 determines that the workpiece W that is being gripped by the suction pad 112 is in contact with the table, and otherwise determines that the workpiece W is not in contact with the table.

$$|(ex-ex0, ey-ey0)| > \varepsilon 4, \text{ or } |ez-ez0| > \varepsilon 5$$

If the operation control unit 13 determines that a part of the workpiece W (the surface that is not suctioned) is in contact with the table (YES in step S212), the process proceeds to step S214. If the operation control unit 13 does not determine that a part of workpiece W is in contact with the table (NO in step S212) at the contact point C, the process returns to step S210, and the operation control unit 13 continues to bring the workpiece W closer to the table.

Step S214

Next, in step S214, the operation control unit 13 determines whether or not the lower surface of the workpiece W and the table are entirely in contact with each other. When the entire lower surface of the workpiece W has come into contact with the table, the inclination of the suction pad 112 and the workpiece W is eliminated, and thus the following expression is satisfied.

$$|(ex-ex0, ey-ey0)| < \varepsilon 4$$

Therefore, the operation control unit 13 determines that the entire lower surface of the workpiece W is in contact with the table if the above expression is satisfied, and otherwise determines that the lower surface of the workpiece W is not in contact with the table.

If the operation control unit 13 determines that the lower surface of the workpiece W and table are entirely in contact with each other (YES in step S214), the operation control unit 13 completes the inclination control of the suction pad 112, and shifts to the control of the amount of pressing described above. If the operation control unit 13 does not determine that the workpiece W and the table are entirely in contact with each other (NO in step S14), the process proceeds to step S216.

Step S216

In step S216, the contact point specifying unit 131 specifies the position of the contact point C where the workpiece W contacts the surface of the table on which the workpiece W is to be placed, based on the deformation of the suction pad 112. Here, the deformation information obtaining unit 113 performs basically the same process as that in step S16 in the operation example 1. However, the deformation information obtaining unit 113 executes the following calculation using the recorded offset {ex0, ey0, ez0}.

$$\theta = \arctan((ey-ey0)/(ex-ex0))$$

When the contact point C where the workpiece W contacts the surface of the table on which the workpiece W is to be placed is specified by the above process, the process proceeds to step S218.

Step S218

In step S218, the operation control unit 13 changes the inclination of the suction pad 112, while maintaining the contact between the workpiece W and the surface of the table on which the workpiece W is to be placed at the specified contact point (contact side). At this time, the operation control unit 13 changes the inclination of the suction pad 112 to reduce the angle formed by the surface of the suctioned workpiece W, which is not the suctioned surface, and the surface of the table on which the workpiece W is to be placed.

Then, the operation control unit 13 basically performs the same process as that in step S18 in the operation example 1 described above, and obtains a command speed for aligning the suction surface of the suction pad 112 to the surface of the table by changing the inclination of the workpiece W while maintaining the contact at the contact point.

However, the operation control unit 13 uses the recorded offset {ex0, ey0, ez0} to perform a calculation by reading the symbols as follows.

ez is read as ez−ez0.

{Pe,φe}: the contact point between the suction pad 112 and the workpiece W is read as the contact point between the workpiece W and the table.

{FK({P, φ}, {Po,Pr, θ}) is read as {FK({P, φ},{Po+Wh/2, Pr+Wl/2, θ})

Here, Wh is the height of the workpiece W, Wl is the width of the workpiece W, and FK is the same kinematics function as FK in step S18 in the operation example 1.

As a result, the expression in step S18 in the operation example 1 is read as follows.

{P, φ}=IK({Pe, φe},{Po, Pr, θ}) is read as
{P, φ}=IK({Pe, φe}, {Po+Wh/2, Pr+Wl/2, θ})

Ik in the above expression is the same kinematics function as IK in step S18 in the operation example 1.

In response to the above process, the operation control unit 13 changes the inclination of the suction pad 112 in accordance with the obtained command speed. Thereafter, the process proceeds to step S220.

Step S220

Next, in step S220, the operation control unit 13 determines whether or not the surface of the workpiece W, which is not the suctioned surface, and the surface of the table on which the workpiece W is to be placed are entirely in contact with each other. At this time, the operation control unit 13 performs the same process as that in the step S214 described above.

If the operation control unit 13 determines that the surface of the workpiece W, which is not the suctioned surface, and the surface of the table on which the workpiece W is to be placed are entirely in contact with each other (YES in step S220), the operation control unit 13 completes the inclination control of the suction pad 112, stops the suction, and releases the workpiece. If the operation control unit 13 does not determine that the surface of the workpiece W, which is not the suctioned surface, and the surface of the table on which the workpiece W is to be placed are entirely in contact with each other (NO in step S220), the process returns to step S218, and the operation control unit 13 continues the inclination control of the suction pad 112.

In the above operation example, the operation control unit 13 specifies the position of the contact point C and the inclination of the suction pad 112 after the surface of the workpiece W, which is not the suctioned surface, and the surface of the table on which the workpiece W is to be placed have come into contact with each other, and changes the inclination of the suction pad 112 so that the surface of the workpiece W, which is not the suctioned surface, and the surface of the table on which the workpiece W is to be placed are entirely in contact with each other while maintaining the contact at the contact point C. In this manner, the orientation of the suction pad 112 can be accurately corrected, and the workpiece W can be placed at an accurate position. Furthermore, it is possible to prevent an impact from being applied to the workpiece W released from the suction pad 112, or prevent that workpiece W from falling over.

Operation Example 4

Figure 13:
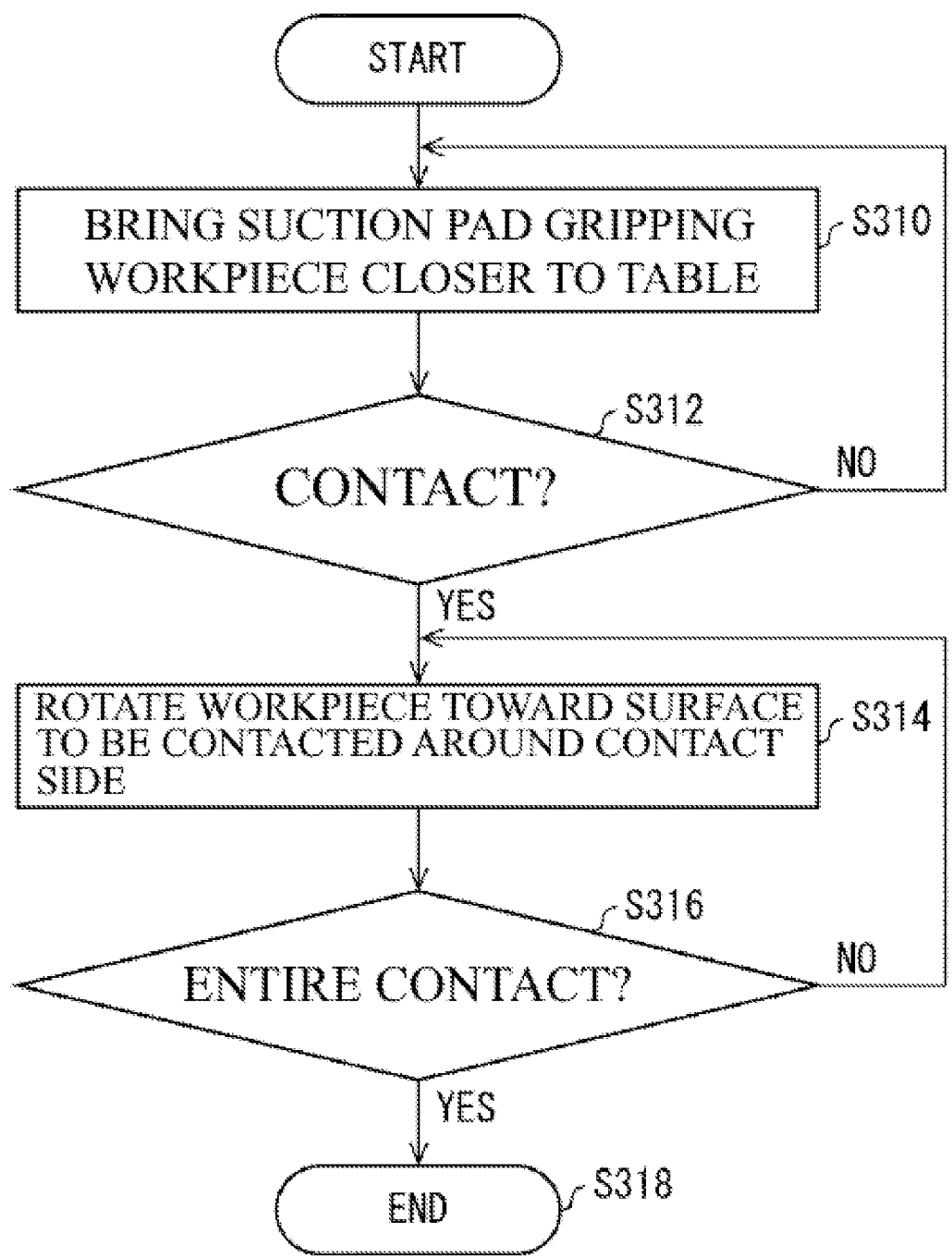
FIG. 13 is a flowchart illustrating an operation of a controller 5 in still another embodiment of the present invention.
Figure 14:
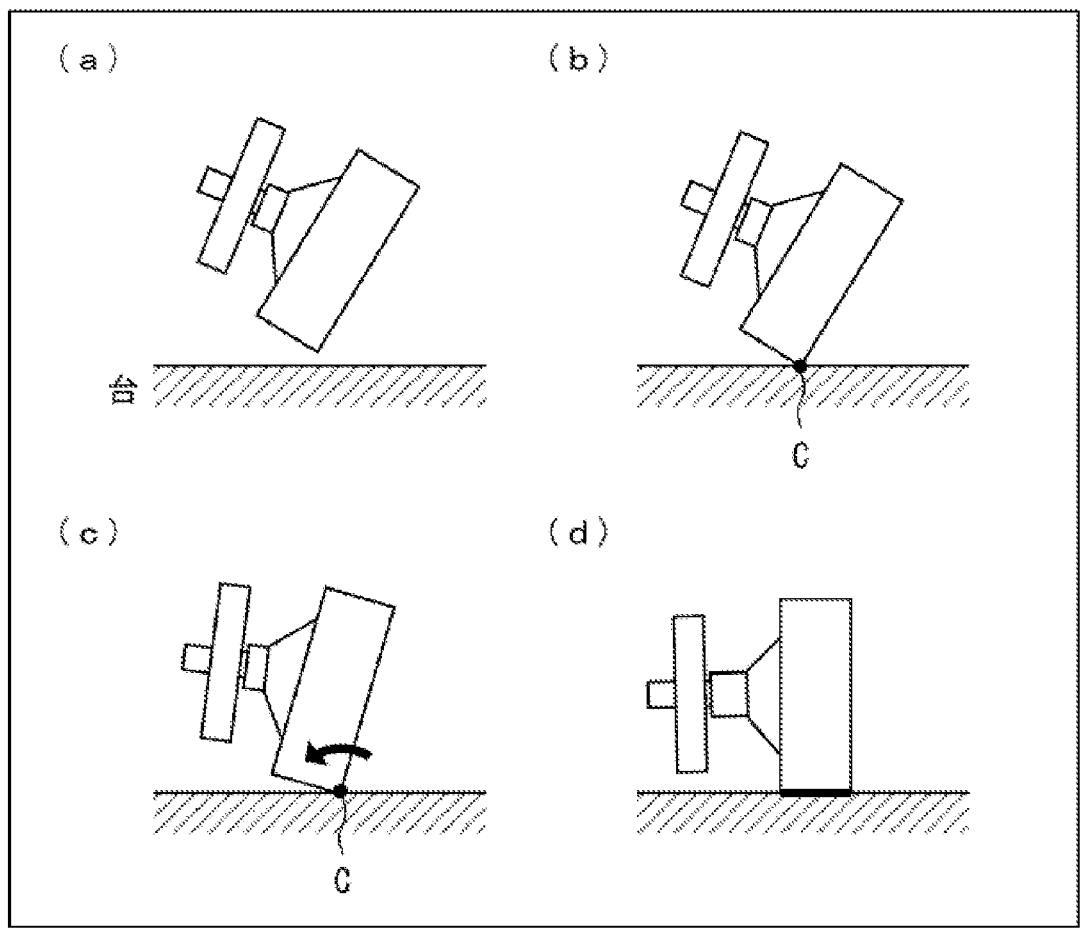
FIG. 14 is a side view diagram illustrating orientation control of a suction pad corresponding to FIG. 13.

Next, with reference to FIG. 13 and FIGS. 14(a) to 14(d), an operation example when the suction pad 112 that is gripping the workpiece W performs surface alignment of the side surface of the workpiece W with respect to the surface of the table on which the workpiece W is to be placed in a situation where the gravity direction is unclear will be described. FIG. 13 is a flowchart showing a control frow of the controller 5 in this case, and FIGS. 14(a) to 14(d) are side views illustrating states of the workpiece W that is gripped by the suction pad 112 and the table.

Step S310

First, in step S310, the operation control unit 13 causes the suction pad 112 that is gripping the workpiece W to approach the surface of the table on which the workpiece W is to be placed (FIG. 14(a)).

Step S312

Next, in step S312, the operation control unit 13 determines whether or not a part of the side surface of the workpiece W that is gripped by the suction pad 112 has come into contact with the table at the contact point C, based on the amount of deformation of the suction pad 112. At this time, the operation control unit 13 performs the same process as that in the step S212 in the above operation example 3. If the operation control unit 13 determines that a part of the side surface of the workpiece W is in contact with the table (YES in step S312), the process proceeds to step S314 (FIG. 14(b)).

If the operation control unit 13 does not determine that a part of the side surface of the workpiece W is in contact with the table (NO in step S312), the process returns to step S310, and the operation control unit 13 continues to bring the workpiece W closer to the table.

Step S314

Next, in step S314, the contact point specifying unit 131 specifies the position of the contact point (contact side) of the workpiece W with the surface of the table on which the workpiece W is to be placed, based on the deformation of the suction pad 112. At this time, the operation control unit 13 performs the same process as that in the step S216 in the above operation example 3. Then, the operation control unit 13 rotates the workpiece W around the contact point (contact side) toward the surface with which the workpiece W is to be brought into contact (surface of the table on which the workpiece W is to be placed) (FIG. 14(c)). That is to say, the operation control unit 13 performs the same process as that in the step S218 in the above operation example 3. Thereafter, the process proceeds to step S316.

Step S316

Next, in step S316, the operation control unit 13 determines whether or not the side surface of the workpiece W and the table are entirely in contact with each other. More specifically, the operation control unit 13 performs the same process as that in the step S212 in the operation example 3. If the deformation information obtaining unit 113 determines that the side surface of the workpiece W and the table are entirely in contact with each other (YES in step S316, FIG. 14(d)), the operation control unit 13 completes the control of inclination of the suction pad 112, stops the suction, and releases the workpiece W. If the operation control unit 13 does not determine that the side surface of the workpiece W and the table are entirely in contact with each other (NO in step S316), the process returns to step S314.

According to the operation example 4, even when the side surface of the workpiece W that is gripped by the suction pad 112 is to be aligned with the surface of the table on which the workpiece W is to be placed under the situation where the gravity direction is not clear, the operation control unit 13 specifies the position of the contact point and the inclination of the suction pad 112 after the side surface of the workpiece W and the surface of the table on which the workpiece W is to be placed have come into contact with each other at the contact point, based on the amount of deformation of the suction pad 112. Thereafter, the operation control unit 13 changes the inclination of the suction pad 112 such that the side surface of the workpiece W to be brought into contact with the surface of the table on which the workpiece W is to be placed comes into contact with the surface of the table on which the workpiece W is to be placed, while maintaining the contact between the workpiece W and the surface of the table on which the object is to be placed at the contact point. As a result, the orientation of the suction pad 112 can be accurately corrected even in a situation where the gravity direction is not clear, and the side surface of the workpiece W can be aligned as appropriate.

Operation Example 5

Figure 15:
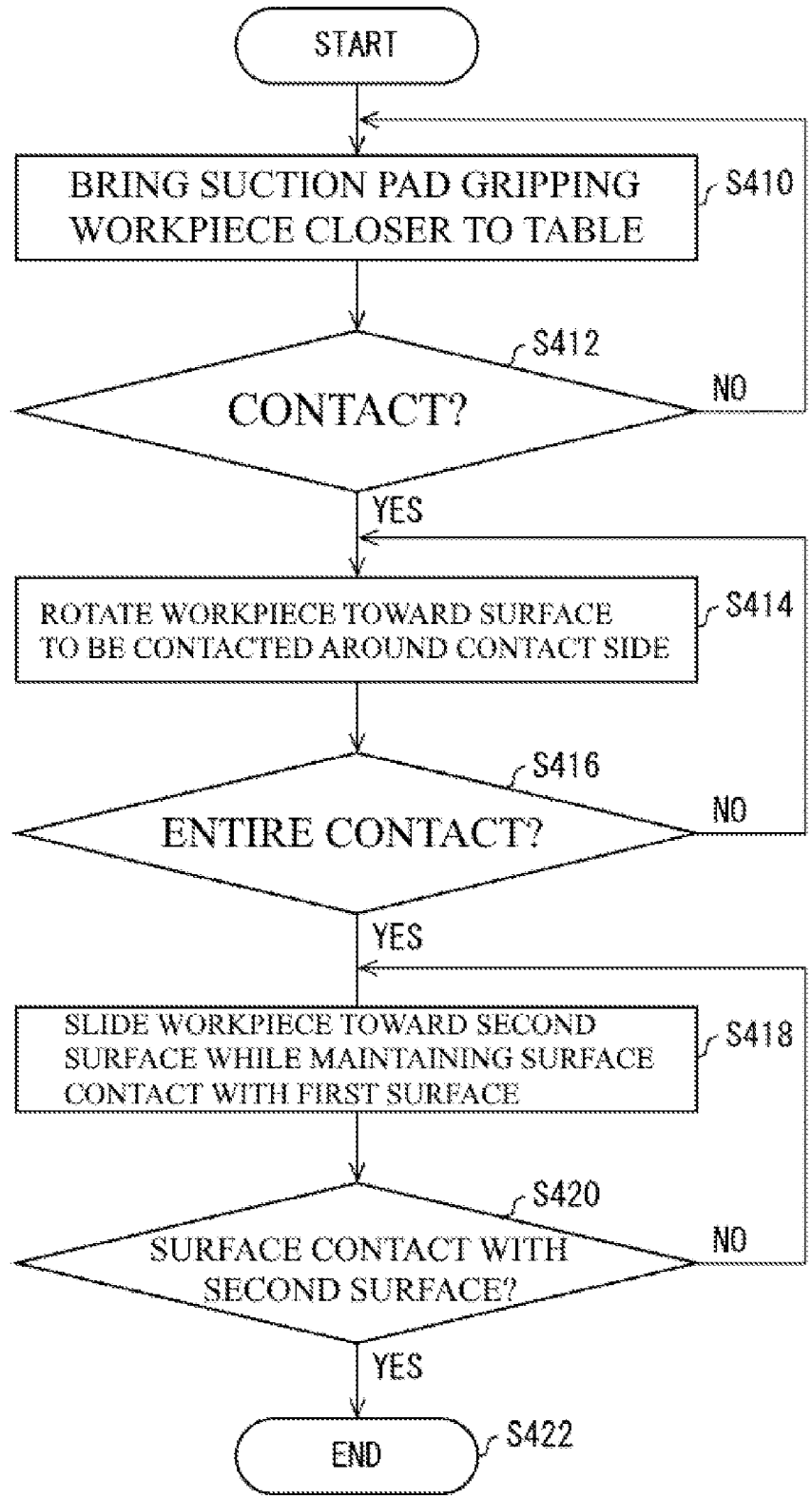
FIG. 15 is a flowchart illustrating an operation of a controller 5 in still another embodiment.
Figure 16:
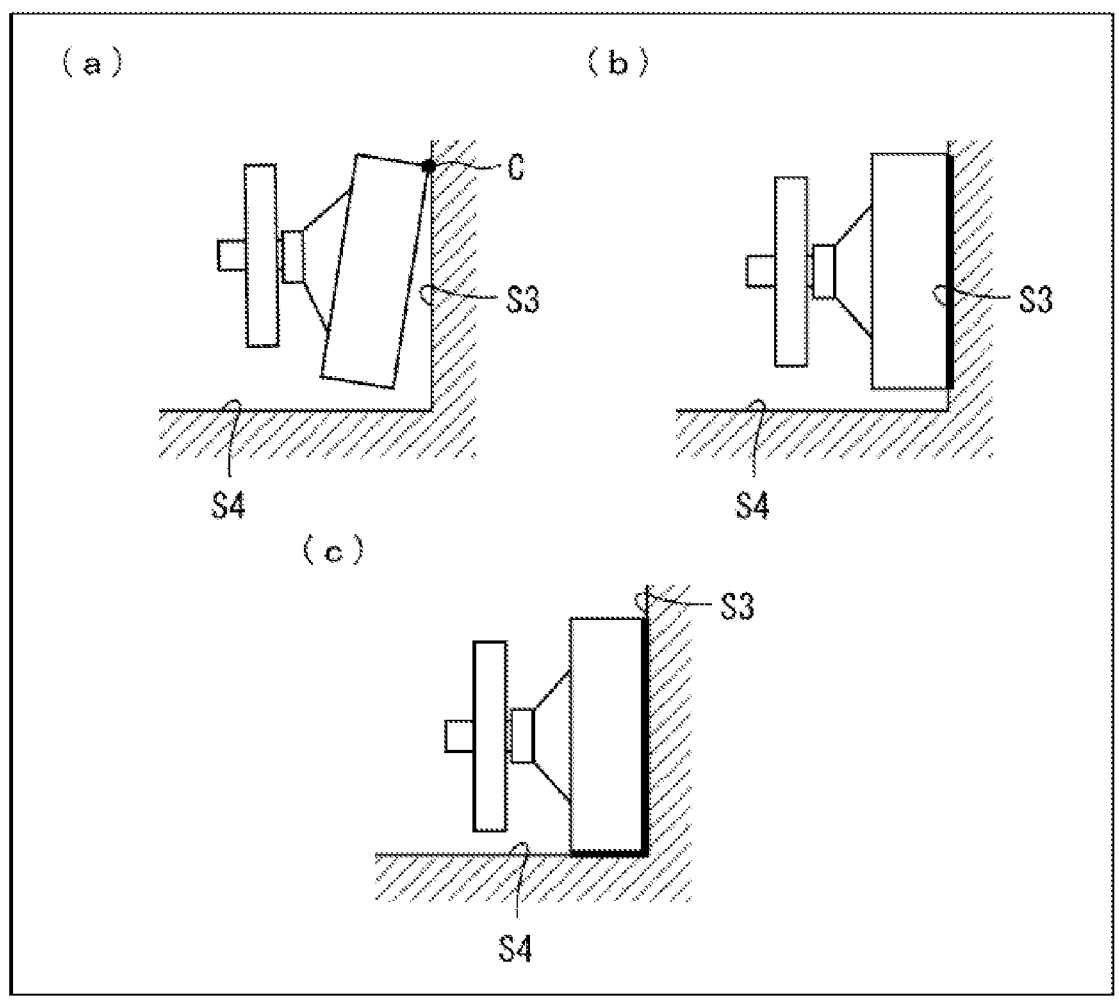
FIG. 16 is a side view diagram illustrating orientation control of a suction pad such as is illustrated in FIG. 15.

Next, with reference to FIG. 15 and FIGS. 16(a) to 16(c), an operation example will be described when the suction pad 112 that is gripping the workpiece W performs surface alignment of two side surface of the workpiece W with respect to two surfaces of the table in a situation where the gravity direction is not clear. FIG. 15 is a flowchart showing a control frow of the controller 5 in this case, and FIGS. 16(a) to 16(c) are side views illustrating states of the workpiece W that is gripped by the suction pad 112 and the table.

Step S410

First, in step S410, the operation control unit 13 brings the suction pad 112 that is gripping the workpiece W closer to the surface on which the workpiece W is to be placed (vertical surface S1).

Step S412

Next, in step S412, the operation control unit 13 determines whether or not a part of the side surface of the workpiece W that is gripped by the suction pad 112 has come into contact with the first surface S1 of the table at the contact side, based on the amount of deformation of the suction pad 112. At this time, the operation control unit 13 performs the same process as that in the step S212 in the above operation example 3. If the operation control unit 13 determines that a part of the side surface of the workpiece W is in contact with the surface S1 of the table (YES in step S412), the process proceeds to step S414 (FIG. 14(a)).

If the operation control unit 13 does not determine that a part of the side surface of the workpiece W is in contact with the table (NO in step S412), the process returns to step S410, and the operation control unit 13 continues to bring the workpiece W closer to the table.

Step S414

Next, in step S414, the contact point specifying unit 131 specifies the position of the contact side of the workpiece W with the surface S1 of the table, based on the deformation of the suction pad 112. At this time, the operation control unit 13 performs the same process as that in step S216 in the operation example 3. Then, the operation control unit 13 rotates the workpiece W around the contact side toward the surface (surface S3) of the table with which the workpiece W is to be brought into contact. In this case, the surface S3 is a wall surface. Thereafter, the process proceeds to step S416.

Step S416

Next, in step S416, the operation control unit 13 determines whether or not the side surface of the workpiece W and the surface S3 of the table are entirely in contact with each other. At this time, the operation control unit 13 performs the same process as that in step S214 in the operation example 3. If the operation control unit 13 determines that the side surface of the workpiece W and the surface S3 of the table are entirely in contact with each other (YES in step S416, FIG. 14(*b*)), the process proceeds to step S418. If the operation control unit 13 does not determine that the side surface of the workpiece W and the surface S3 of the table are entirely in contact with each other (NO in step S416), the process returns to step S414.

Step S418

Next, in step S418, the operation control unit 13 slides the workpiece W on the surface S3 toward the horizontal surface (surface S4) of the table, while maintaining the surface contact between the side surface of the workpiece W and the surface S3 of the table. Thereafter, the process proceeds to step S420.

Step S420

Next, in step S420, the operation control unit 13 determines whether or not the workpiece W has come into surface contact with the surface S4, which is the second surface. At this time, the operation control unit 13 performs the same process as that in step S214 in the operation example 3. If the operation control unit 13 determines that the side surface of the workpiece W and the surface S4 of the second surface of the table are entirely in contact with each other (YES in step S420), the operation control unit 13 completes the surface alignment process (FIG. 14(*c*)). If the operation control unit 13 does not determine that the side surface of the workpiece W and the surface S4 of the table are in surface contact with each other (NO in step S420), the process returns to step S418.

According to the operation example 5, even when the two outer surface of the workpiece W that is gripped by the suction pad 112 are aligned with the two inner surface of the table under the situation where the gravity direction is not clear, the operation control unit 13 can determine that the one surface of the workpiece W and the first surface of the table are completely aligned with each other based on the amount of deformation of the suction pad 112, and then slide the workpiece W toward the second surface. As a result, even in a situation where the gravity direction is not clear, the orientation of the suction pad 112 can be accurately corrected, and the workpiece W can be accurately aligned with the two surfaces of the table.

In the above operation examples, the controller 5 of the present invention controls the operation of the suction pad 112 attached to the robot arm 11. However, there is no limitation to this configuration, and the present invention can be applied to any suction pad.

While the embodiments of the present invention have been described in detail, the above description is merely illustrative of the present invention in every respect. Various modifications and variations can be made without departing from the scope of the invention. The following modifications are possible, for example. For convenience of description, the same reference numerals are used for the same members as those in the above-described embodiments, and the description of the same points as those in the above embodiments is omitted as appropriate.

Modified Example

Figure 17:
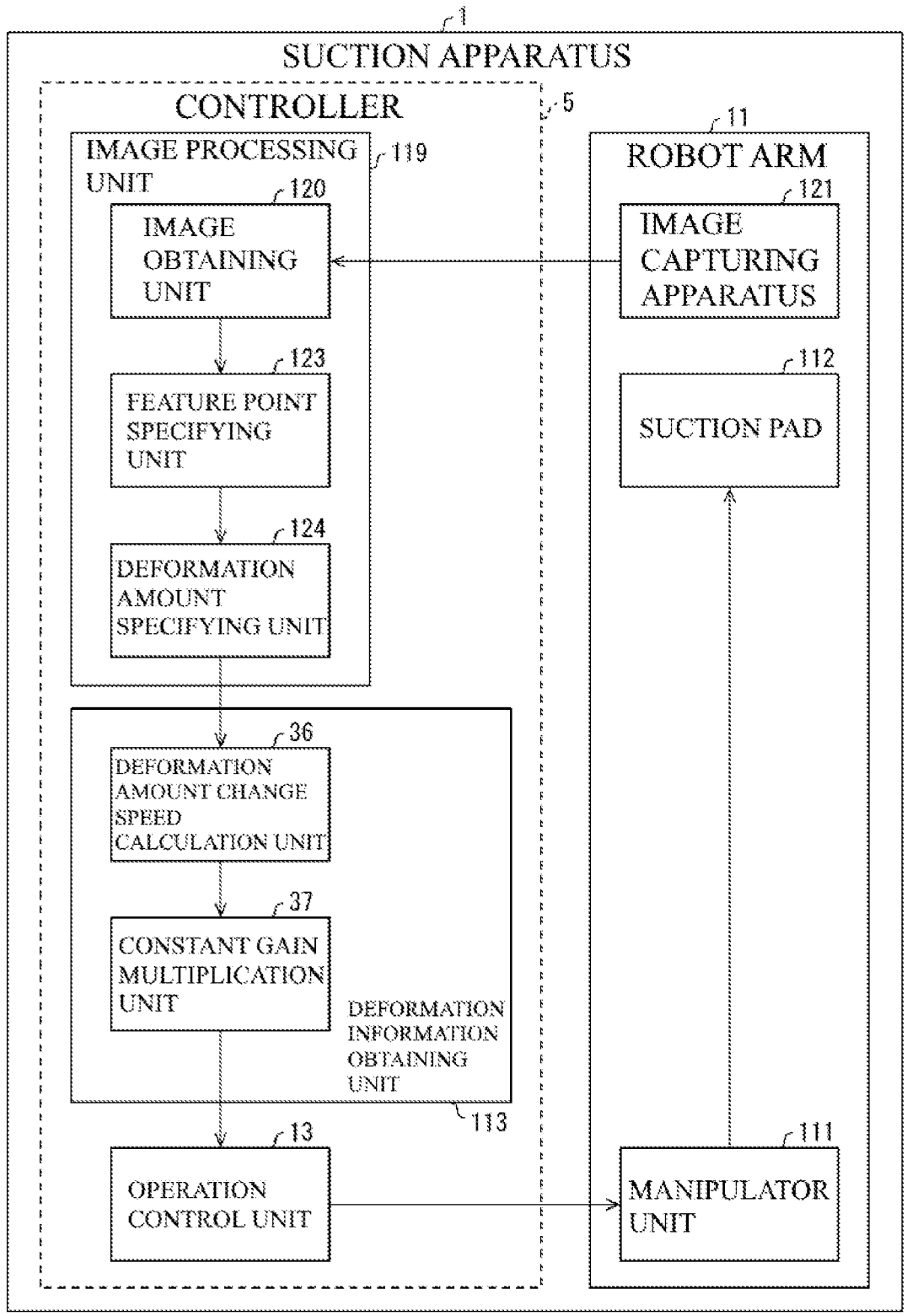
FIG. 17 is a block diagram illustrating an example of a schematic configuration of a suction apparatus including a controller 5 according to a modified example.

FIG. 17 is a block diagram illustrating an example of a schematic configuration of a modified example of the suction apparatus 1 according to the present embodiment. In the example of FIG. 17, the controller 5 of the suction apparatus 1 includes an image processing unit 119 and a deformation information obtaining unit 113, and the deformation information obtaining unit 113 includes a deformation amount change speed calculation unit 36 and a constant gain multiplication unit 37. The deformation amount change speed calculation unit 36 may also be included in the image processing unit 119, instead of the deformation information obtaining unit 113.

The suction apparatus 1 including the controller 5 of the modified example includes a robot arm 11, a vacuum pump (not shown), and the controller 5. The robot arm 11 includes a suction pad 112, an image capturing apparatus 121, and a manipulator unit 111. The image capturing apparatus 121 is fixedly disposed on the side of the suction pad 112, and captures an image of a variable portion of the suction pad 112. Due to the suction apparatus 1 including the image capturing apparatus 121, the suction apparatus 1 can obtain the state of the variable portion of the suction pad 112 before and after deformation using the image or the like, and calculate the amount of deformation of the suction pad 112 based on the obtained data.

The controller 5 includes an image processing unit 119, a deformation information obtaining unit 113, and an operation control unit 13. The image processing unit 119 includes an image obtaining unit 120, a feature point specifying unit 123, and a deformation amount specifying unit 124.

The image capturing apparatus 121 captures an image of the variable portion of the suction pad 112. The image data may be monochrome image data, or may also be color image data.

The image obtaining unit 120 obtains image data captured by the image capturing apparatus 121. Then, the image obtaining unit 120 inputs the obtained image data to the feature point specifying unit 123.

The feature point specifying unit 123 specifies the feature point of the variable portion included in the image data that is received from the image obtaining unit 120. The feature point specifying unit 123 specifies feature points in the image data corresponding to the plurality portions of the variable portion 118, based on the pattern formed on the variable portion, which is included in the received image data. Then, the feature point specifying unit 123 outputs, to the deformation amount specifying unit 124, the coordinate values of the feature points in the image coordinate system. The feature point specifying unit 123 also specifies the coordinates (a plurality of coordinates) of the fixed portions, which are not deformed, of the suction pad 112, as the reference coordinates. The displacement of the respective feature points can be obtained, based on the coordinates of the feature points relative to the reference coordinates.

The deformation amount specifying unit 124 specifies the amounts of deformation of the plurality of portions of the variable portion (that is to say, the amount of deformation of the suction pad 112), based on the feature points (coordinate values) and the coordinates of the fixed portions that are output from the feature point specifying unit 123.

The deformation amount change speed calculation unit 36 calculates the change speed of the amount of deformation, by time-differentiating the amount of deformation that is specified by the deformation amount specifying unit 124. Then, the deformation amount change speed calculation unit 36 outputs the change speed of the amount of deformation to the constant gain multiplication unit 37.

The constant gain multiplication unit 37 calculates a deceleration value, by multiplying the change speed of the amount of deformation (the angular velocity of the suction surface of the suction pad, for example), which is calculated by the deformation amount change speed calculation unit 36, by a constant. The constant gain multiplication unit 37 outputs the calculated deceleration value to the operation control unit 13.

The operation control unit 13 stores a target moving speed of the suction pad 112 for conveying the object. The operation control unit 13 obtains the command speed, by subtracting the deceleration value from the target moving speed. The operation control unit 13 controls the manipulator unit 111 to move the hand (suction pad 112) of the manipulator at the command speed. By changing the speed of the hand of the robot arm to reduce the change speed of the amount of deformation of the suction pad 112, vibration of the suction pad 112 (vibration of the object) can be reduced.

Similarly, the operation control unit 13 may also change the inclination of the suction pad 112 to decrease the change speed of the amount of deformation, based on the change speed of the amount of deformation. By changing the inclination of the suction pad 112, the vibration of the suction pad 112 can be controlled. In addition, by utilizing the inclination of the suction pad 112 for vibration damping control, the positioning time at the time of stopping conveyance can be minimized, and the conveyance processing time (conveyance tact time) can be shortened.

Figure 18:
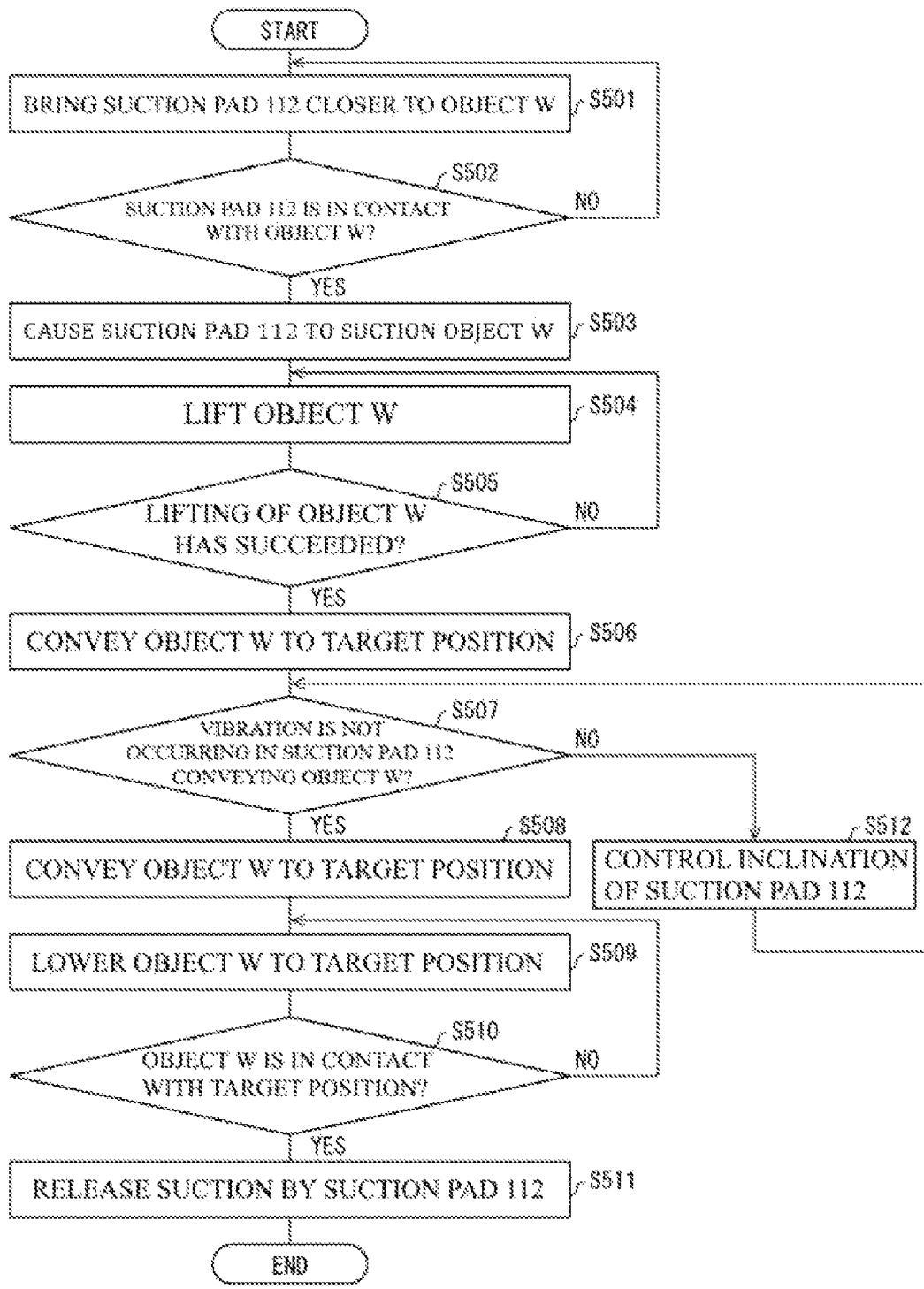
FIG. 18 is a flowchart illustrating a operation of a suction apparatus including a controller 5 according to a modified example.

FIG. 18 is a flowchart showing an example of a process flow in a modified example 3 of the deformation measuring apparatus according to the present embodiment.

Figure 19:
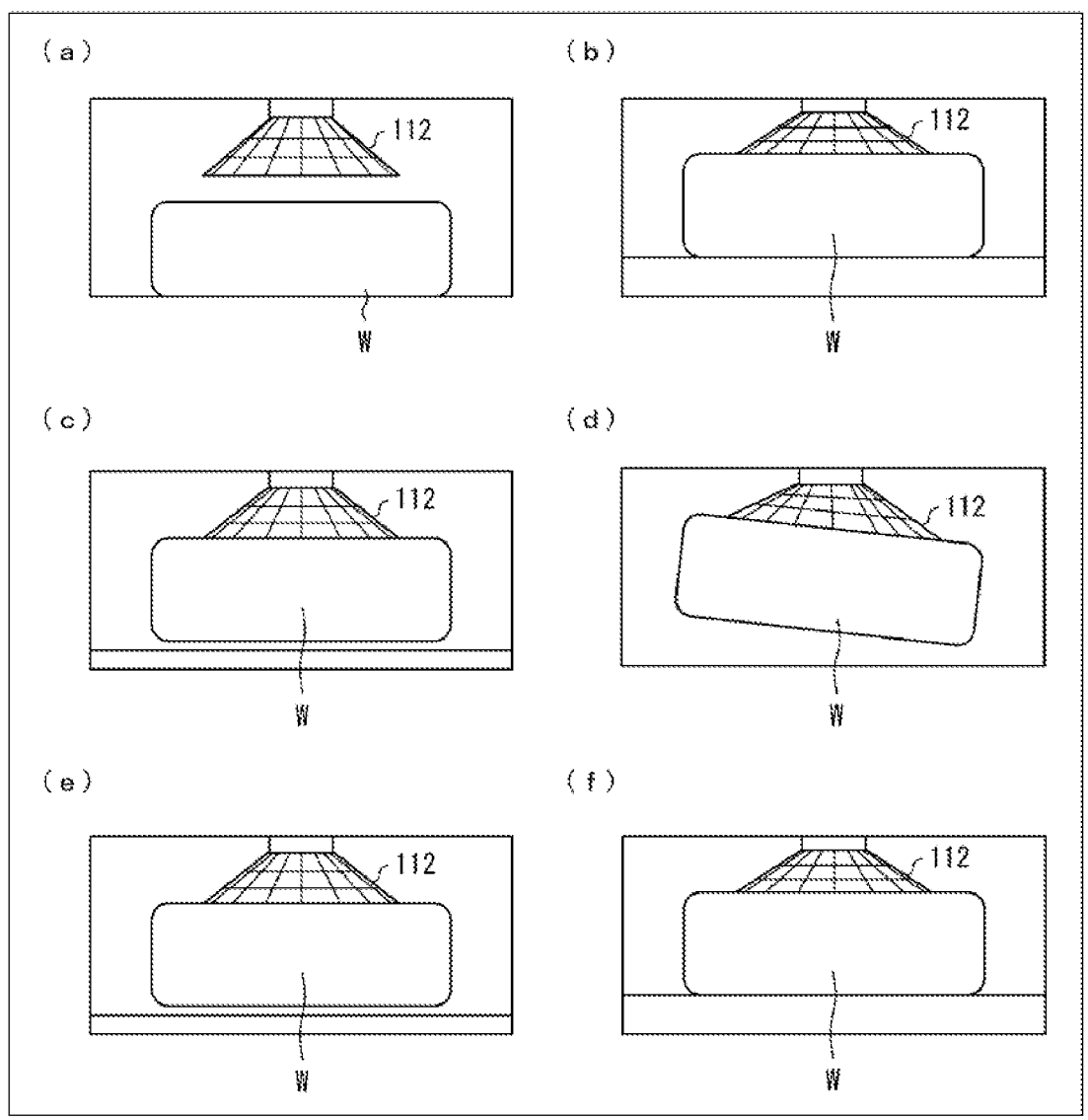
FIG. 19 is a schematic diagram illustrating an example of a process flow of a suction apparatus including a controller 5 according to a modified example.

In step S501, the operation control unit 13 brings the suction pad 112 closer to the object W. The example of FIG. 19(*a*) shows the process in step S501. Next, in step S502, the operation control unit 13 determines whether or not the suction pad 112 is in contact with the object W. Whether or not the suction pad 112 is in contact with the object W can be determined by the amount of deformation of the variable portion of the suction pad 112. If the amount of deformation is larger than or equal to a threshold value, the operation control unit 13 determines that the suction pad 112 is in contact with the object W. If the operation control unit 13 determines that the suction pad 112 is in contact with the object W (YES in step S502), the operation control unit 13 causes the suction pad 112 to suction the object W (step S503). The example of FIG. 19(*b*) shows the process in step S503. If the operation control unit 112 determines that the suction pad 112 is not in contact with the object W (NO in step S502), the operation control unit 13 executes the processes of step S501 and step S502 again.

In step S504, the operation control unit 13 causes the manipulator unit 111 to lift the object W. The example of FIG. 19(*c*) shows the process in step S504. Next, in step S505, the operation control unit 13 determines whether or not the lifting of the object W has succeeded. Whether or not the object W has been successfully lifted can be determined by the amount of deformation of the variable portion of the suction pad 112. If the amount of deformation is larger than or equal to another threshold value, the operation control unit 13 determines that the lifting of the object W has succeeded. If the operation control unit 13 determines that the lifting of the object W has succeeded (YES in step S505), the object W is conveyed to the target position (step S506). The example of FIG. 19(*d*) shows the process in step S506. If the operation control unit 13 determines that the lifting of the object W has failed (NO in step S505), the operation control unit 13 executes the processes of steps S504 and step S505 again.

In step S507, the operation control unit 13 determines whether or not vibration occurs in the suction pad 112 that is conveying the object W. If the change speed of the amount of deformation of the suction pad 112 is larger than or equal to still another threshold value, the operation control unit 13 determines that the vibration is occurring on the suction pad 112 that is conveying the object W. If the operation control unit 13 determines that no vibration is occurring in the suction pad 112 that is conveying the object W (YES in step S507), the object W is conveyed to the target position without changing the inclination of the object W (step S508). If the operation control unit 13 determines that the vibration is occurring in the suction pad 112 that is conveying the object W (NO in step S507), the operation control unit 13 controls the inclination of the suction pad 112 (step S512). Then, the operation control unit 13 executes the process in step S507 again.

In step S209, the operation control unit 13 causes the manipulator unit 111 to lower the object W to the target position. The example of FIG. 19(*e*) shows the process in step S209. Next, in step S510, the operation control unit 13 determines whether or not the object W has come into contact with the target position. Whether or not the object W has come into contact with the target position can be determined by the amount of deformation of the variable portion of the suction pad 112. If the amount of deformation is larger than or equal to still another threshold value, the operation control unit 13 determines that the object W has come into contact with the target position. If the operation control unit 13 determines that the object W has come into contact with the target position (YES in step S510), the operation control unit 13 releases the suction of the suction pad 112 (step S511). The example of FIG. 19(*f*) shows a case in which the determination of the process in step S510 is YES. If the operation control unit 13 determines that the object W has not come into contact with the target position (NO in step S510), the operation control unit 13 executes the processes of step S509 and step S510 again.

Implementation Example Using Software

The functions of the control blocks of the mobile suction apparatus 100 (in particular, the units of the controller 5: the negative pressure control unit 21; the deformation information obtaining unit 113; and the operation control unit 13, and the abnormality determination unit 115) may also be achieved by a logic circuit (hardware) that is formed on an integrated circuit (IC chip) or the like, or may also be achieved by software.

In the latter case, the mobile suction apparatus 100 includes a computer that executes instructions of a program, which is software for achieving the functions. This computer includes, for example, one or more processers and a computer-readable recording medium storing the program. Then, due to the processor of the computer reading the program from the recording medium and executing the program, the object of the present invention is achieved. As the processor, for example, a central processing unit (CPU) can be used. Examples of the recording medium include a "non-transitory tangible medium" such as a read only memory (ROM), a tape, a disk, a card, a semiconductor memory, and a programmable logic circuit. In addition, a random access memory (RAM) or the like for developing the program may also be further provided. Furthermore, the program may also be supplied to the computer via any transmission medium (a communication network, a broadcast wave, or the like) capable of transmitting the program. Note, that the embodiment of the present invention can also be achieved in the form of a data signal embedded in a carrier wave in which the program is embodied by electronic transmission.

For the present invention, there is no limitation to the embodiments described above, and various modifications are possible within the scope of the claims. Embodiments obtained by appropriately combining technical means disclosed in different embodiments are also included in the technical scope of the present invention. Furthermore, new technical features can be formed by combining the technical means disclosed in each of the embodiments.

INDEX TO THE REFERENCE NUMERALS

1 Suction apparatus
100 Mobile suction apparatus
2 Conveyance unit
3 Battery
5 Controller
11 Robot arm
12 Vacuum pump
13 Manipulator control unit (operation control unit)
14 Object information obtaining unit
15 Placement information obtaining unit
21 Negative pressure control unit
22 Automated guided vehicle
111 Manipulator unit
113 Deformation information obtaining unit
112 Suction portion (suction pad)
119 Image processing unit
120 Image obtaining unit
121 Image capturing apparatus
123 Feature point specifying unit
124 Deformation amount specifying unit
131 Contact point specifying unit
114 Sensor
115 Abnormality determination unit
211 Analog signal output unit
221 Conveyance control unit

The invention claimed is:

1. A controller comprising:
a deformation information obtaining unit configured to obtain information on deformation of a suction portion that suctions an object with negative pressure, and that is deformed by the negative pressure; and
an operation control unit configured to control movement of the suction portion in accordance with deformation of the suction portion, wherein the operation control unit comprises a contact point specifying unit configured to:
specify a contact point where the suction portion contacts the object based on deformation of the suction portion; and
specify said contact point where the object contacts a surface on which the object is to be placed, based on deformation of the suction portion, in a state where the suction portion is suctioning the object.

2. The controller according to claim 1,
wherein the operation control unit is configured to change an inclination of the suction portion in accordance with deformation of the suction portion.

3. The controller according to claim 2,
wherein the operation control unit is configured to change said inclination of the suction portion to reduce an angle formed by a suction surface of the suction portion and a surface of the object to be suctioned.

4. The controller according to claim 3,
wherein
the operation control unit is configured to change said inclination of the suction portion while maintaining contact between the suction portion and the object at the contact point.

5. The controller according to 3,
wherein the operation control unit is configured to change the speed of the suction portion in accordance with deformation of the suction portion.

6. The controller according to claim 2,
the operation control unit is configured to change said inclination of the suction portion while maintaining contact between the suction portion and the object at the contact point.

7. The controller according to claim 6,
wherein the operation control unit is configured to rotate the suction portion within a plane including a central axis of the suction surface of the suction portion and the contact point.

8. The controller according to 7,
wherein the operation control unit is configured to change the speed of the suction portion in accordance with deformation of the suction portion.

9. The controller according to 6,
wherein the operation control unit is configured to change the speed of the suction portion in accordance with deformation of the suction portion.

10. The controller according to claim 2,
wherein, in a state where the suction portion is suctioning the object, the operation control unit is configured to change said inclination of the suction portion to reduce an angle formed by a surface of the suctioned object, which is not the suctioned surface, and a surface on which the object is to be placed.

11. The controller according to claim 10,
wherein
the operation control unit is configured to change said inclination of the suction portion, while maintaining contact between the object and the surface on which the object is to be placed at the contact point.

12. The controller according to 10,
wherein the operation control unit is configured to change the speed of the suction portion in accordance with deformation of the suction portion.

13. The controller according to claim 2,
wherein,
the operation control unit is configured to change said inclination of the suction portion, while maintaining contact between the object and the surface on which the object is to be placed at the contact point.

14. The controller according to 13, wherein the operation control unit is configured to change the speed of the suction portion in accordance with deformation of the suction portion.

15. The controller according to 2, wherein the operation control unit is configured to change the speed of the suction portion in accordance with deformation of the suction portion.

16. The controller according to claim 1, wherein the operation control unit is configured to change a speed of the suction portion in accordance with deformation of the suction portion.

17. The controller according to claim 16, wherein, if an amount of deformation of the suction portion exceeds a first threshold value, the operation control unit is configured to reduce a speed at which the suction portion is brought closer to the object.

18. The controller according to claim 16, wherein, if an amount of deformation of the suction portion exceeds a second threshold value, the operation control unit is configured to stop an operation of bringing the suction portion closer to the object.

19. The controller according to claim 1, wherein the deformation information obtaining unit is configured to obtain one or more of an amount of deformation or a speed of deformation of the suction portion, and the operation control unit is configured to control the movement of the suction portion in accordance with the obtained one or more of the amount of deformation and/or or the speed of deformation of the suction portion.

20. A method of controlling a suction apparatus including a suction portion that suctions an object with negative pressure, and that is deformed by the negative pressure, the control method comprising:
obtaining information on deformation of the suction portion; and
controlling movement of the suction portion in accordance with deformation of the suction portion, wherein controlling the movement of the suction portion comprises:
specifying a contact point where the suction portion contacts the object based on deformation of the suction portion; and
specifying said contact point where the object contacts a surface on which the object is to be placed, based on deformation of the suction portion, in a state where the suction portion is suctioning the object.

* * * * *